US005594243A

United States Patent [19]

Weinberger et al.

[11] Patent Number: 5,594,243
[45] Date of Patent: Jan. 14, 1997

[54] LASER DESORPTION IONIZATION MASS MONITOR (LDIM)

[75] Inventors: Scot R. Weinberger, Reno; Robert W. Egan, Reno; Thomas W. Hoppe, deceased, late of Reno, all of Nev., by Curtis A. Orgill, executor; Ernst Gassmann, Hofstetten, Switzerland; Martin M. Schör, Spiegel, Switzerland; Klaus O. Börnsen, Staufen, Germany; E. Rocco Tarantino, Reno, Nev.

[73] Assignee: Hewlett Packard Company, Palo Alto, Calif.

[21] Appl. No.: 27,317

[22] Filed: Mar. 4, 1993

Related U.S. Application Data

[63] Continuation-in-part of Ser. No. 847,450, Mar. 6, 1992, Pat. No. 5,382,793.

[51] Int. Cl.[6] ........ B01D 59/44

[52] U.S. Cl. ........ 250/288; 250/281; 250/423 P

[58] Field of Search ........ 250/288, 288 A, 250/281, 282, 440.11, 442.11, 287, 423 P

[56] References Cited

U.S. PATENT DOCUMENTS

| | | | |
|---|---|---|---|
| 4,728,796 | 3/1988 | Brown | 250/423 P |
| 4,920,264 | 4/1990 | Becker | 250/282 |
| 5,045,694 | 9/1991 | Beavis et al. | 250/287 |

*Primary Examiner*—Jack I. Berman
*Assistant Examiner*—James Beyer

[57] ABSTRACT

A laser desorption ionization instrument for measuring the molecular weight of large organic molecules includes a time of flight (TOF) mass spectrometer. The time of flight mass spectrometer includes a sample lock for holding, under vacuum, a plurality of samples to be analyzed. A sample may be inserted into and removed from the sample lock and into the mass spectrometer without breaking vacuum in the spectrometer. Signal processing electronics of the LDIM instrument include means for identifying quasi-molecular species of a molecule being measured. The instrument includes improvements in ion optics, microchannel plate detectors, laser irradiation of samples, and preparation of samples for measurement.

24 Claims, 21 Drawing Sheets

LASER DESORPTION IONIZATION MASS MONITOR (LDIM)

CROSS-REFERENCE TO RELATED APPLICATIONS

The present application is a continuation-in-part of U.S. application Ser. No. 07/847,450, filed Mar. 6, 1992, now U.S. Pat. No. 5,382,793, entitled Laser Desorption Ionization Mass Monitor (LDIM).

BACKGROUND OF THE INVENTION

The present invention relates in general to methods of determining or monitoring the weight of organic molecules. It relates in particular to time of flight (TOF) measurement methods using laser desorption ionization of molecules to be measured.

Time of flight methods of determining molecular weight are normally used for large molecules such as organic molecules (having a molecular weight greater than about 100,000 daltons). Such molecules are generally so heavy that many well known mass spectrometric methods, such as magnetic sector and quadropole magnetic sector are ineffective. For magnetic sector mass spectrometry, ionized species are produced in a vacuum and passed through a magnetic field. The magnetic field is varied in intensity to selectively guide analyte towards a detector. A correlation between magnetic intensity and molecular charge ratio is used to determine analyte mass. Large organic molecules may be sufficiently heavy in relationship to their charge (charge/mass ratio) that they are not readily deflected by such magnetic fields. In an effort to compensate for this shortcoming, some techniques, such as electrospray, rely upon the generation of high multiple charges (10–50) to facilitate the analysis of large molecular weight constituents. However, such approaches yield multiple signals for a single analyte, thus greatly increasing the complexity of data interpretation.

In time of flight methods of mass spectrometry, charged (ionized) molecules are produced in a vacuum and accelerated by an electric field produced by an ion-optic assembly into a free flight tube or drift tube. The velocity to which the molecules may be accelerated is proportional to the square root of the accelerating potential, the square root of the charge of the molecule, and inversely proportional to the square root of the mass of the molecule. The charged molecules travel, i.e. "drift" down the TOF tube to a detector. Since the total travel distance for molecules is fixed and since velocity is defined as distance traveled divided by travel time, it becomes apparent that the molecular weight of a molecule is proportional to the square of its flight or travel time.

Laser desorption ionization mass monitoring is a TOF mass monitoring method wherein charged molecules of a species to be measured, or analyzed, are produced by laser irradiation (in vacuum) of a crystalline host matrix including a small proportion, for example between about 1:1000 and 1:100,000 of the species. The wavelength of the incident radiation is dependent upon the absorbance characteristics of the matrix. Thus, the host matrix is selected to optimally absorb the radiation. The absorption of this energy results in the ejection or desorption of analyte molecules from the matrix in the form of charged molecules (ions). The desorbed, charged molecules are then accelerated into a drift tube by electric fields produced by an ion optic assembly. The time of flight of the molecules through the tube is generally determined by detecting the irradiating pulse and using the detected signal to start a timing process. Charged molecules generated by the irradiating pulse are intercepted by a detector after they have traversed the drift tube. The time interval existing from the start signal to the detector pulse establishes the time of flight. Molecular weight to charge ratio of the analyte is determined using the following function:

$$M/Z=F\cdot\tau^2+C$$

where τ is the flight time, F is a factor dependent upon flight distance and molecular kinetic energy, and C is a constant. The values of F+C are determined by calibrating the function using a standard of predetermined molecular weight.

Two classifications of LDIM instruments have been established, microprobe instruments and bulk analysis instruments.

In a microprobe instrument, laser irradiation is finely focused to a small spot on a foil containing the analyte. The laser radiation is in the form of a short pulse of very high power density. The power density is such that a small hole is produced in the foil. Analyte ions are desorbed from the foil and emerge from the hole. A commercially available LDIM microprobe instrument is described in Hillenkamp, F., et al., Int. J. Mass Spec. Ion Physics, vol. 47, 1983, 19–22.

Bulk analysis instruments use moderately focussed beams, for example, beams focussed to a spot having an area greater than about 0.1 square millimeters. The beams are incident on a surface including the analyte in a host matrix. The matrix and analyte are applied in the form of a thin crystallized layer or layers on a surface forming the tip of a sample probe. In the bulk analysis instrument, an area on the probe tip may be irradiated sequentially, with multiple laser pulses. This may be helpful, for example, in gathering statistical data on measurements. Additionally, the irradiated region of the probe may be off its central axis, allowing the desorption of several different probe regions to be achieved by rotating the probe tip. Alternatively, such a probe may be sequestered into several different circumferential sample regions in which the off axis array permits the simultaneous introduction of multiple samples into the ion source.

In prior art ionization methods used in mass spectrometry, energetic or "hard" ionization processes, for example, using energy exchange within a gas discharge, may produce fragmentation of analyte molecules, i.e. the formation of metastable ions having a range of different weights.

In both microprobe and bulk LDIM methods the laser desorption ionization method produces what may be termed "soft ionization" of an analyte. Soft ionization provides that predominantly single charged unfragmented analyte ions are generated. Preferably, ions are desorbed by a laser pulse having an intensity just above that threshold intensity required to cause desorption. In a pulsed laser it is difficult to provide pulses of repeatable intensity particularly if a laser is operated intermittently. Further, thresholds may vary between matrix sample combinations. If a pulse has an intensity significantly greater than the desorption threshold, adducts may be formed by the addition of one or more matrix molecules to a sample. This causes a distribution of indicated molecular weights around a true value leading to measurement uncertainty or loss of mass resolution. Additionally, variance in laser power can cause variability in the total kinetic energy of analyte molecules. Such variances create a reduction in resolution when successive scans for a given sample probe are summed.

In LDIM, resolution is determined by M/ΔM where M is the assigned mass value for the analyte (usually the peak centroid) and ΔM is the molecular weight width of the peak at its half height (this corresponds to the molecular weight distribution for the peak at its first moment). This is a measurement of an instrument's ability to produce separate signals from ions (molecules) of similar mass. LDIM mass resolution is dependent upon the molecular weight of an analyte. Generally, mass resolution decreases as analyte molecular weight increases. The latter may be attributed to increased molecular population heterogeneity of composition and initial desorption velocity distribution.

Instrumental limitations to resolution primarily arise from uncertainties in flight time measurement, variance in flight path distance, and variance of total molecular kinetic energy.

Uncertainty in flight time measurement stems from the error in determining flight time duration from one desorption event to the other. Such error originates in timing jitter inherent to electronic trigger and detection circuitry. When successive desorptive events (sample scans) are summed in an effort to increase signal to noise performance, this jitter phenomenon creates a broadening of the summed signal.

In order for the time-of-flight experiment to work, the total flight distance and total kinetic energy for a given population of molecules must be constant. If all molecules of a given population do not travel along the same flight path, a variance of flight distance will result. This variance will create a distribution of flight times for identical molecules, resulting in an increase in the molecular weight distribution for that population at its first moment. The result is a broadening of the signal created by each individual scan. Alterations in flight path may be due to discontinuities of ion optic electrical fields, molecular collision during free-flight, and thermal-induced axial diffusion.

The total kinetic energy imparted to charged particles in the time-of-flight experiment is the sum of the initial kinetic energy transferred to the analyte by the laser pulse and the kinetic energy transferred in the ion optic, acceleration region. Alterations in laser pulse intensities from one desorptive event to the other create a variance of total kinetic energy for this series of events. This variance, in turn, results in the broadening of the resultant signal when such events are summed, reducing resultant resolution.

In a similar manner, ion-optic, acceleration electrical field variances cause alterations in molecular total kinetic energy. These variances may be due to electrical instability of the ion components (coronal discharge, current leakage, current limitations, etc.) or alterations in DC voltage intensity due to the presence of AC ripple.

A preferred detector for LDIM instruments is a microchannel plate MCP detector. Such a detector consists of one or two microchannel plates. Two plates are arranged in a tandem array. Each plate consists of a plurality of microscopic tubes which are held in an electric field. Ion collisions with the wall of these tubes incite the release of electrons. These electrons then cascade down these tubes releasing more electrons. This results in a conversion of electrical charge from ions to electrons with a simultaneous increase in total charge. These electrons are then utilized by electronic circuitry to produce a signal.

Ion detection sensitivity may be enhanced by employing a mass filter. A mass filter is a pulsed, electrical field applied perpendicular with respect to ion propagation just after the ion acceleration region. Mass filtering is achieved when this perpendicular electrical field deflects ions from the proper propagational path during its energized state. Consequently, these deflected ions never strike the detector, thus preserving the available electrons required for the microchannel plate cascade phenomenon. Such an arrangement may be used as a high-pass mass filter if careful and accurate timing algorithms are employed to deflect analyte of the desired mass by applying the deflection pulse only during the time period in which the unwanted analyte is resident in the deflection field. The field must then rapidly collapse to allow subsequent ions to pass through into the remainder of the free-flight zone, unaltered in their trajectories.

Another source of uncertainty in LDIM measurements is the formation of ions of the same molecule having different charges or clusters of two or more molecules having one or more unit charges molecules. These may be referred to as quasi molecular ions and will have different flight times in an LDIM instrument. As such, they may indicate that different molecules are present in a sample and thus lead to difficulty in assessing the purity of a sample.

Still another source of uncertainty in LDIM measurements may lie in the preparation of samples. It is important to lay down an even, reproducible co-crystalline layer of matrix and analyte on a sample probe tip. In order to insure regular non-biased co-crystallization of matrix and analyte, the crystallization event must occur rapidly, on the order of five to fifteen seconds. Typically, a sample-matrix mixture consists of organic and aqueous solvent components. Such a solvent mixture is required to solvate matrix and analyte molecules, possessing both hydrophobic and hydrophilic characteristics. If co-crystallization slowly progresses, solvent composition gradually become increasingly hydrophilic as the more volatile, organic constituents vaporize. Accordingly, we see a temporal based crystallization order in which hydrophobic solutes crystalize first followed by hydrophilic solutes. For the most part, matrix molecules are largely hydrophobic. Consequently, matrix molecules will preferentially co-crystalize with sample solutes of low hydrophilicity, biasing the resultant ion signal against hydrophilic sample components. Rapid co-crystallization avoids these problems. A preferred means of crystallization is through the use of vacuum application. A droplet of homogenous matrix/analyte solution may be applied to a probe tip. The drop is then crystallized by applying a vacuum to the probe tip to remove volatile fluid components. If the droplet is irregular in shape then thickness and sample distribution in the crystallized layer can be nonhomogeneous leading to unreproducible measurement results. If vacuum application is not variable, highly lipophilic analyte/matrix mixtures will be difficult to crystalize since more volatile components of the mixture will cause less volatile components to bubble.

U.S. Pat. No. 5,045,694 discloses an electrospray method of applying matrix to a probe tip. Although this method appears to produce better matrix layers, it involves applying a potential of about five thousand volts to the probe tip during application of the layers. This makes the method somewhat hazardous and can lead to corona discharge between the probe tip and the spray apparatus which may damage the probe tip and spray apparatus.

In view of the foregoing it will be evident that although LDIM provide a potentially convenient method for monitoring molecular weight of large organic molecules, there is a need for improvement in many hardware aspects of the technology including sample preparation, delivery of laser and deflection pulses, ion optics, and detectors. There is also a need for improved signal processing technology to identify and eliminate uncertainties which may arise, particularly from the generation of quasi molecular ions.

SUMMARY OF THE INVENTION

It is an object of the present invention to provide improvements in resolution, reproducibility, and accuracy in LDIM monitoring of organic molecules. This has been accomplished by providing improvements in several facets of LDIM analysis and instruments including: sample preparation methods; methods of introducing samples into an LDIM instruments; methods of laser irradiating samples in an LDIM instrument; mass filtering-pulsed deflection; ion optics; laser optics, including reproducibility of the incident laser irradiation; microchannel plate detectors; and interpretation of measurement results.

BRIEF DESCRIPTION OF THE DRAWING

The accompanying drawings, which are incorporated in and constitute a part of the specification, schematically illustrate a preferred embodiment of the invention and, together with the general description given above and the detailed description of the preferred embodiment given below, serve to explain the principles of the invention.

DETAILED DESCRIPTION OF THE INVENTION

Figure 1:
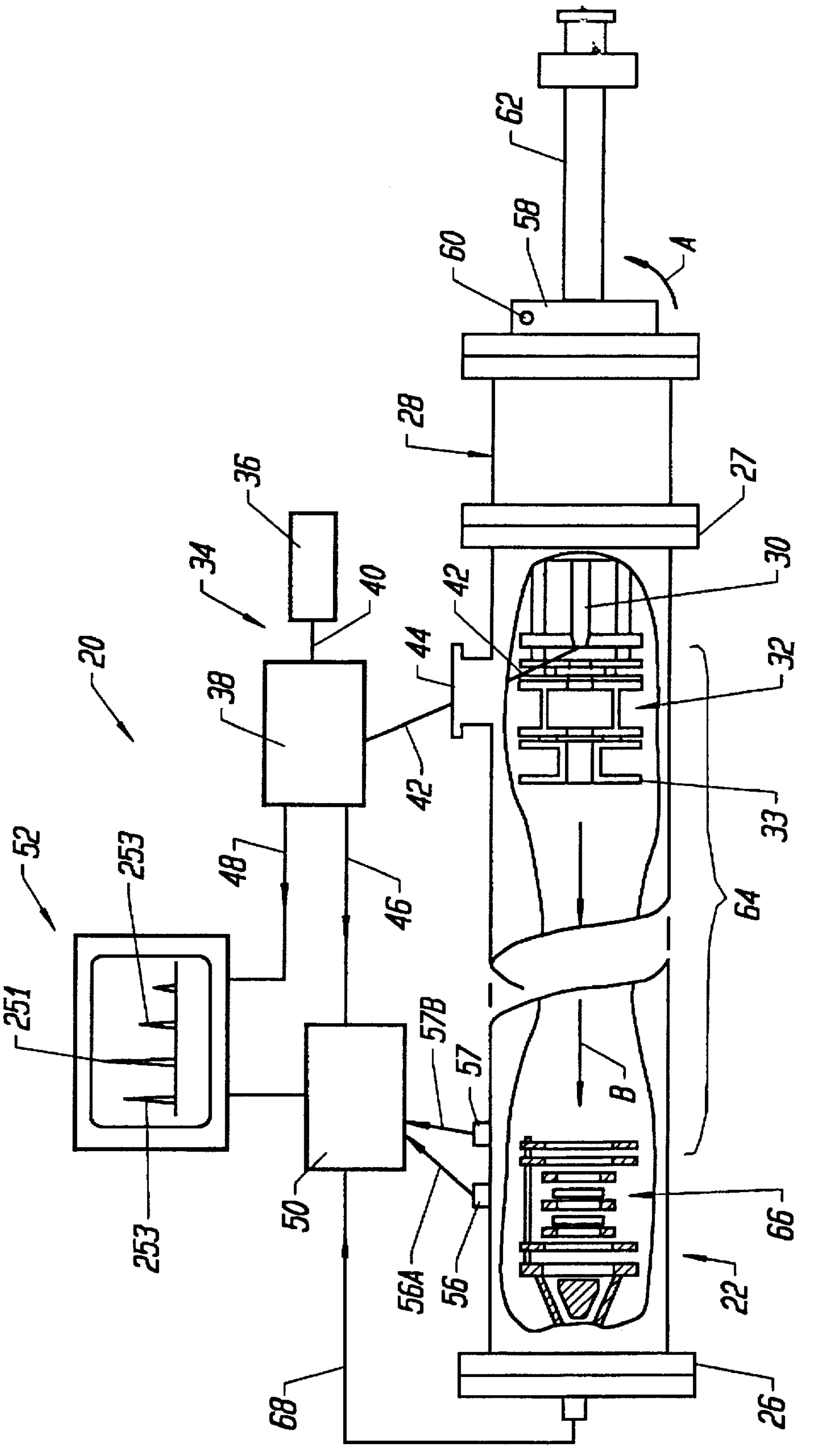
FIG. 1 schematically illustrates an LDIM instrument according to the present invention.

Referring now to the drawings in which like components are designated by like reference numerals, FIG. 1 shows a preferred embodiment of an LDIM instrument designated by the general numeral 20. Instrument 20 includes a generally cylindrical first vacuum chamber 22 having end flanges 24 and 26. Chamber 22 may be referred to as a time of flight tube, a flight tube, or a drift tube. Chamber 22 is provided with means (not shown) such as mechanical roughing pump and a high vacuum pump such a turbomolecular pump for establishing a pressure of $10^{-7}$–$10^{-8}$ torr therein. Mounted on end flange 24, is a second vacuum chamber 28, which may be termed a sample chamber. Sample chamber 28 is provided with means such as a mechanical vacuum pump for creating a rough vacuum therein. Sample chamber 28 may be isolated from or placed in vacuum communication with chamber 22. Located in sample chamber 28 is a means for storing a plurality of samples for analysis. Further details of sample lock 28 and the sample storage means will be given below. Samples to be analyzed, in the form of crystallized layers of an analyte/matrix mixture are introduced through gate valve 28A and flange 24 into chamber 22 on a probe tip 30 and into ion optics 32. Ion optics 32 include a deflector 33 for deflecting low mass ions.

Laser radiation for irradiation of samples is provided by laser optics 34 which includes a pulsed laser 36 and a laser beam train 38 including various components (not shown in FIG. 1) for focussing and directing a beam (pulse) 40 from the laser. Laser beam train 38 directs an output laser beam 42, which may be termed an irradiating pulse, into chamber 22 and onto probe tip 30 through a laser port 44. Laser beam train 38 also provides a signal 46 indicating the initiation of the irradiating pulse from laser beam train 38. Signal 46 is delivered to a microprocessor 50. Laser beam train 38 also provides a signal 48, indicating the intensity of the irradiating pulse, to a computing device 52 such as a personal computer. Signals 46 and 48 may be provided, for example by photodiodes.

Vacuum tube 22 may be provided with a rough vacuum gauge 56, such as pirani gauge and a high vacuum gauge 57, preferably a cold cathode discharge gauge. Gauges 56 and 57 provide signals 56*a* and 56*b* respectively to microprocessor/digitizer 50. Signals 56*a* and 56*b* may be used for example to control the evacuation of vacuum chamber 22 and to determine a safe point for energizing ion optics 32.

Figure 2A:
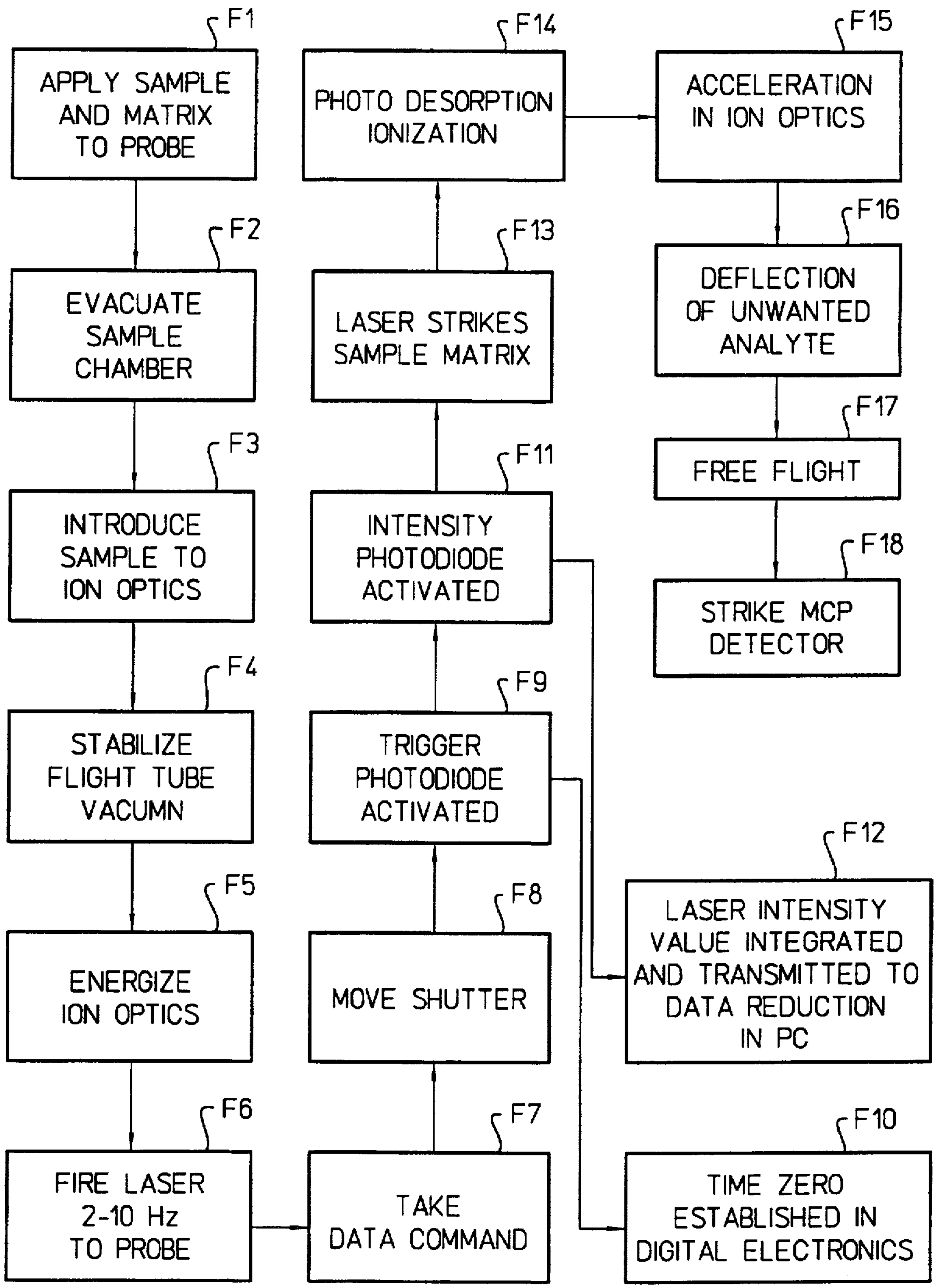
FIG. 2A is a flow chart depicting the sequence of various steps of operation of the instrument of FIG. 1.

Other components depicted in FIG. 1 will now be described in conjunction with a description of an exemplary operation sequence of instrument 20. The general theory of operation and signal processing may be followed in flow chart form by references to FIGS. 2A–2B wherein various steps are depicted in blocks F1–F18 for FIG. 2A and blocks F20–29 for FIG. 2B.

A crystallized layer of sample/matrix mixture is applied to probe tip 30 (Block F1) and the sample placed through a vacuum valve or lock 58 (which may be termed the sample lock) into sample chamber 28. Sample lock 58 may be opened and closed by pivoting it about pivot 60 in the direction indicated by arrow A. Sample chamber 28 is evacuated (Block F2) to roughing levels. Gate value 28A is opened, allowing probe tip 30 to be introduced (Block F3) into ion optics 32 by manipulating a shaft (not shown in FIG. 1) located within a tube 62 in vacuum communication with sample chamber 28. Vacuum in chamber 22 is allowed to stabilize (Block F4). Ion optics 32 are then energized (Block F5). The laser shutter (FIG. 10, 180) is opened and the laser is fired to deliver an irradiating pulse (Block F6).

Figure 10:
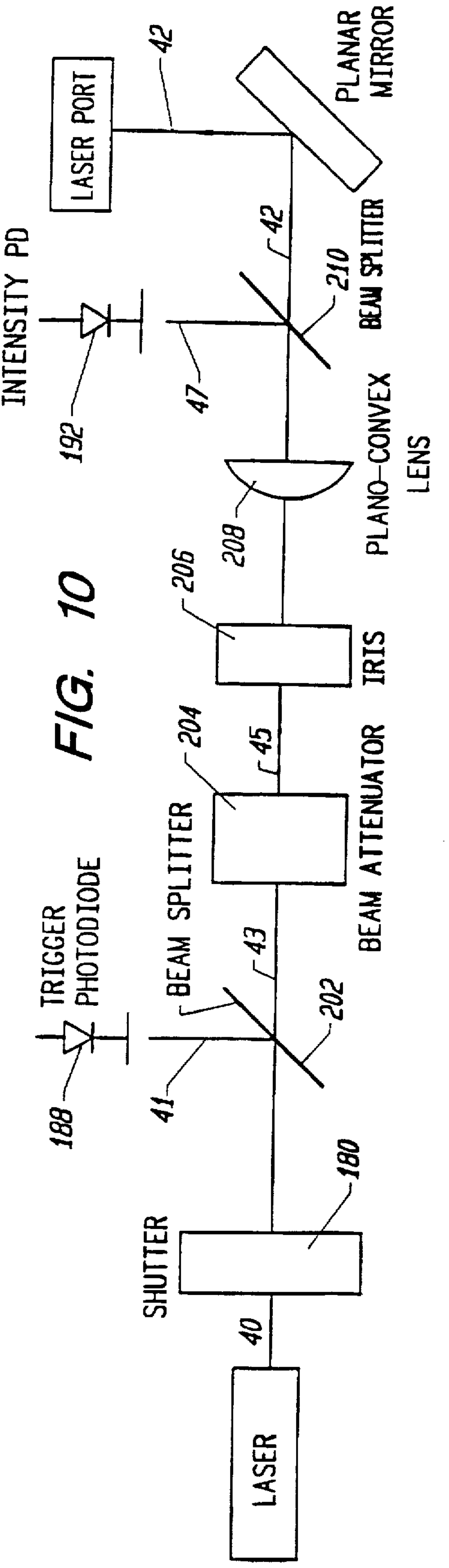
FIG. 10 schematically illustrates an embodiment of laser optics including beamsplitters and an attenuator.

After the firing of the laser at Block F6, the present invention provides a data command at Block F7, which then provides for moving shutter 180 of FIG. 10 at Block F8. Following to Block F9, the operation triggers the photodiode activation which provides a time zero reference established in the digital electronics (Block F10).

The intensity photodiode is activated at Block F11, which provides for integration of the laser intensity value transmitted to data reduction in the PC (Block F12).

At Block F13 the laser beam strikes the sample matrix, and the photo desorption ionization operation occurs at Block F14. As will be described in more detail, this provides for acceleration in the ion optics at Block F15, followed by the deflection of unwanted analyte at Block F16. The resulting free flight at Block F17 provides for striking of the microchannel plate (MCP) detector at Block F18.

Figure 2B:
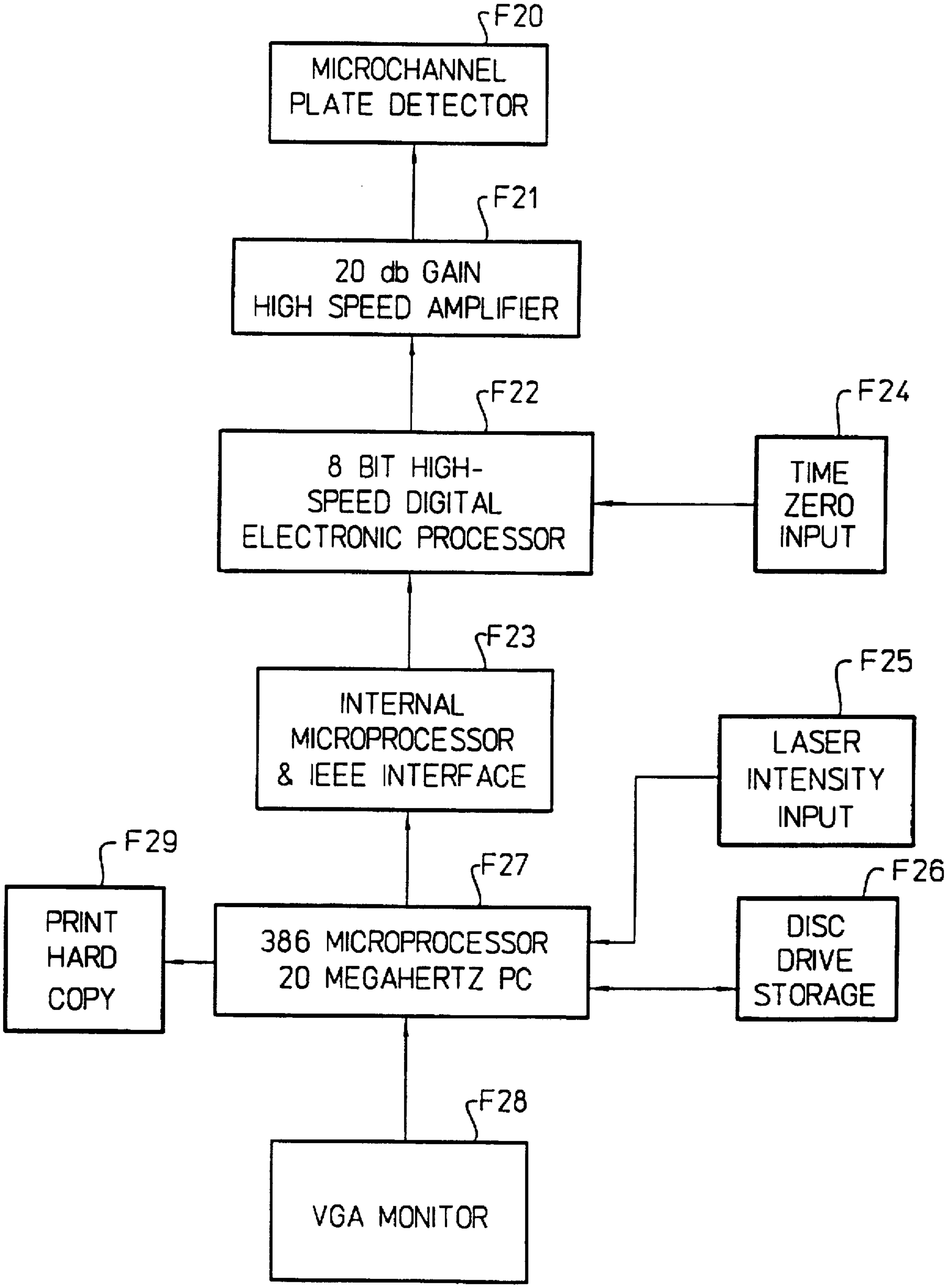
FIG. 2B is a flow chart depicting the sequence of various steps of signal processing of the instrument of FIG. 1.

The signal processing sequence is illustrated in FIG. 2B. The microchannel plate detector at Block F20 provides an input to high speed amplifier (20 db Gain, 10–100 mHz band-width) at Block F21. The amplifier provides an input to an 8 or 12 bit high speed digital electronic processor at Block F22, which also receives the time zero input from Block F24.

The processor output is input to an internal microprocessor/IEEE Interface at Block F23 which further is input to a 386 or 486-based microprocessor 20–50 mHz PC at Block F27. The PC at Block F27 also receives the laser intensity input from Block F25 and provides for disk drive storage at Block F26 as well as printing hard copy at Block F29 and connection to a suitable VGA monitor at Block F28.

The brief description of the function and principle components of instrument 20 given above is provided to assist in understanding certain improvements and useful features of these key components which contribute to improved reproducibility and accuracy in LDIM measurements. These improvements and useful features are included in the detailed description of certain principle components of instrument 20 set forth below.

Figure 3:
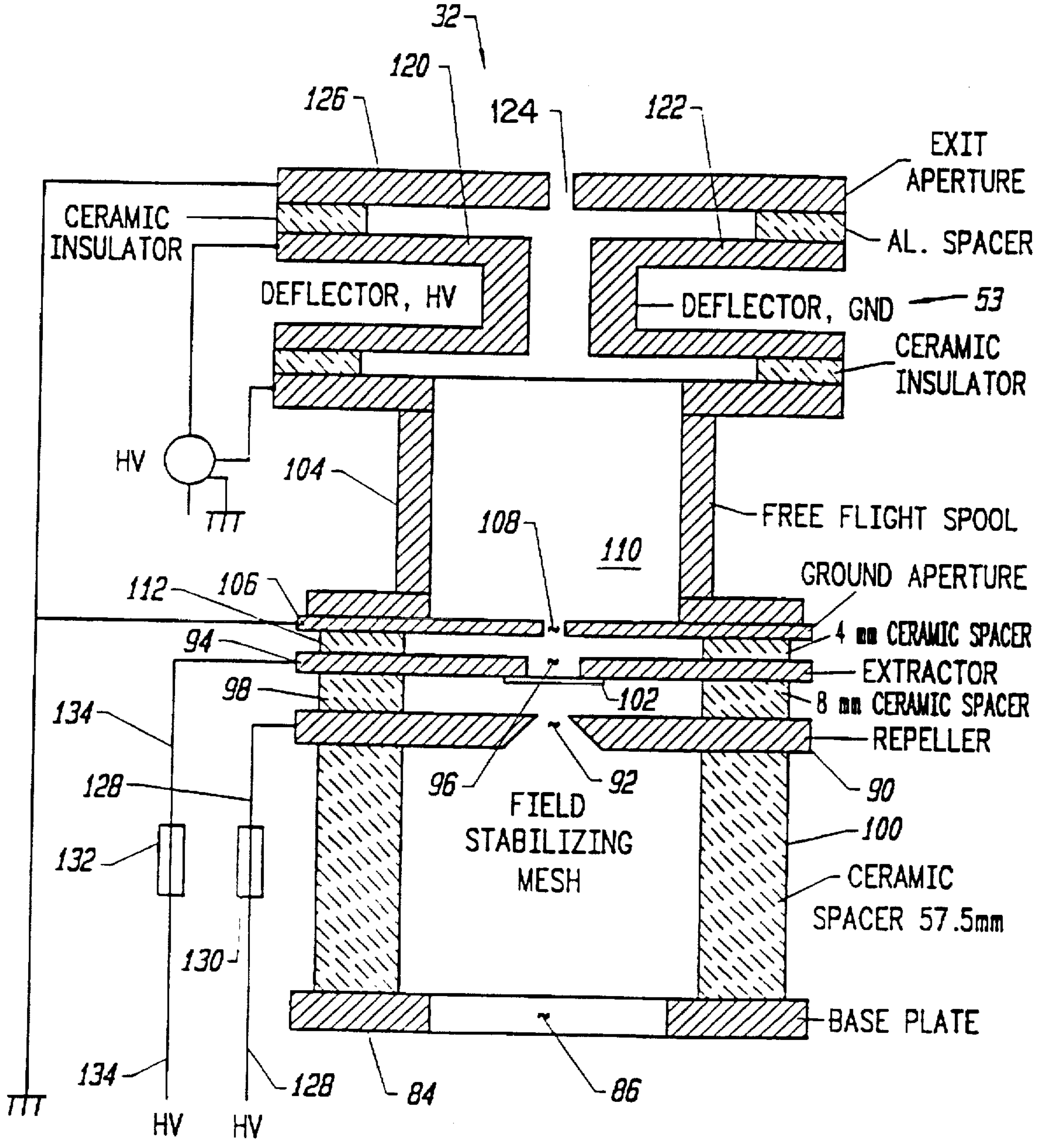
FIG. 3 is a cross section view schematically illustrating details of ion optics according to the present invention.

Referring now to FIG. 3, ion optics 32 includes a base plate 84 having an aperture 86 therein, a repeller 90 having an aperture 92 therein, and an extractor 94 having an aperture 96 therein. Repeller 90 and extractor 94 are separated or spaced by an insulating spacer 98. Repeller 90 is separated by a ceramic spacer 100 from base plate 89. A sample to be irradiated is inserted into aperture 92.

The potential and spacing of repeller 90 and extractor 94 has been found important in achieving optimum mass resolution. Preferably, repeller 90 and extractor 94 are spaced by a distance of about eight millimeters (8 mm). Repeller 90 is preferably held at a potential between about 28,000 volts and 32,000 volts and extractor 94 is preferably held at a potential between about 9,000 volts and 15,000 volts. Potentials applied to repeller 90 and extractor 94 may be positive or negative depending on whether anions or cations are being desorbed from the sample. Applying these potentials has been referred to in the general description above as energizing ion optics 32. The potentials are preferably adjustable for fine tuning the performance of ion optics 32.

A field stabilizing mesh 102, 103 may be located across apertures 96 and 108 for providing a more homogeneous electric field across those apertures. The mesh 102 may be of copper, gold or aluminum wires having a spacing of between about fifty and one hundred lines per inch. The potentials on repeller 90 and extractor 94 may be provided by a high voltage power supply (not shown) via high voltage connections HV. The extractor and repeller current from the power supply may be monitored, for example by microprocessor 50, for magnitude and variation of the magnitude. If the magnitude or variation exceeds predetermined limits, this may be interpreted as indication of the onset of corona discharge or current leakages. If the total current magnitude steadily exceeds from 100 to 900 picoamps, the ion optics may be de-energized to avoid potential damage. If the current profile fluctuates by ±1.5%, the scanned data may be discounted. The latter minimizes band broadening and decreased resolution due to variances in molecular total kinetic energy.

Figure 4A:
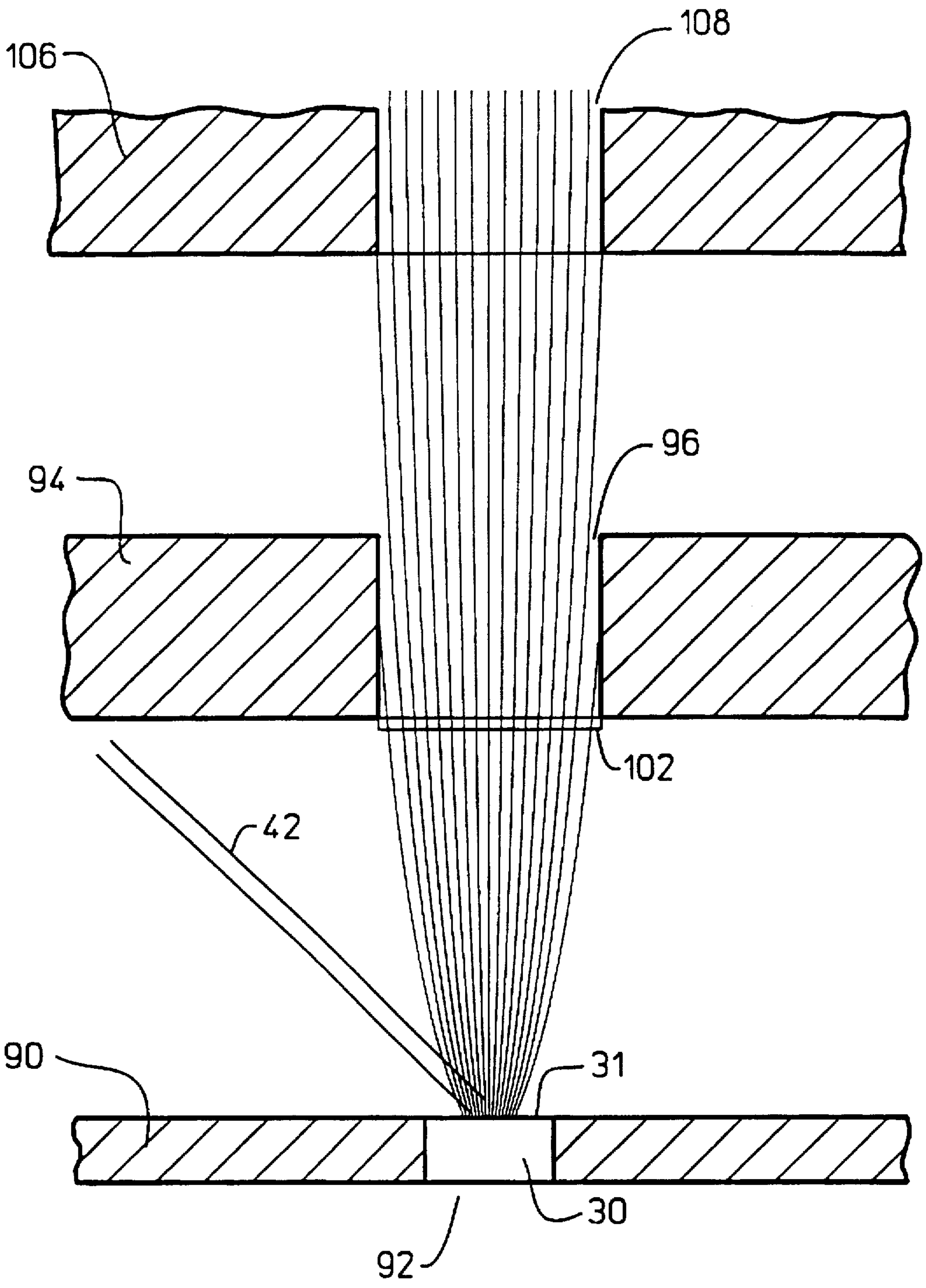
FIG. 4A schematically illustrates details of a repeller, extractor and sample arrangement in the ion optics of FIG. 3.
Figure 4B:
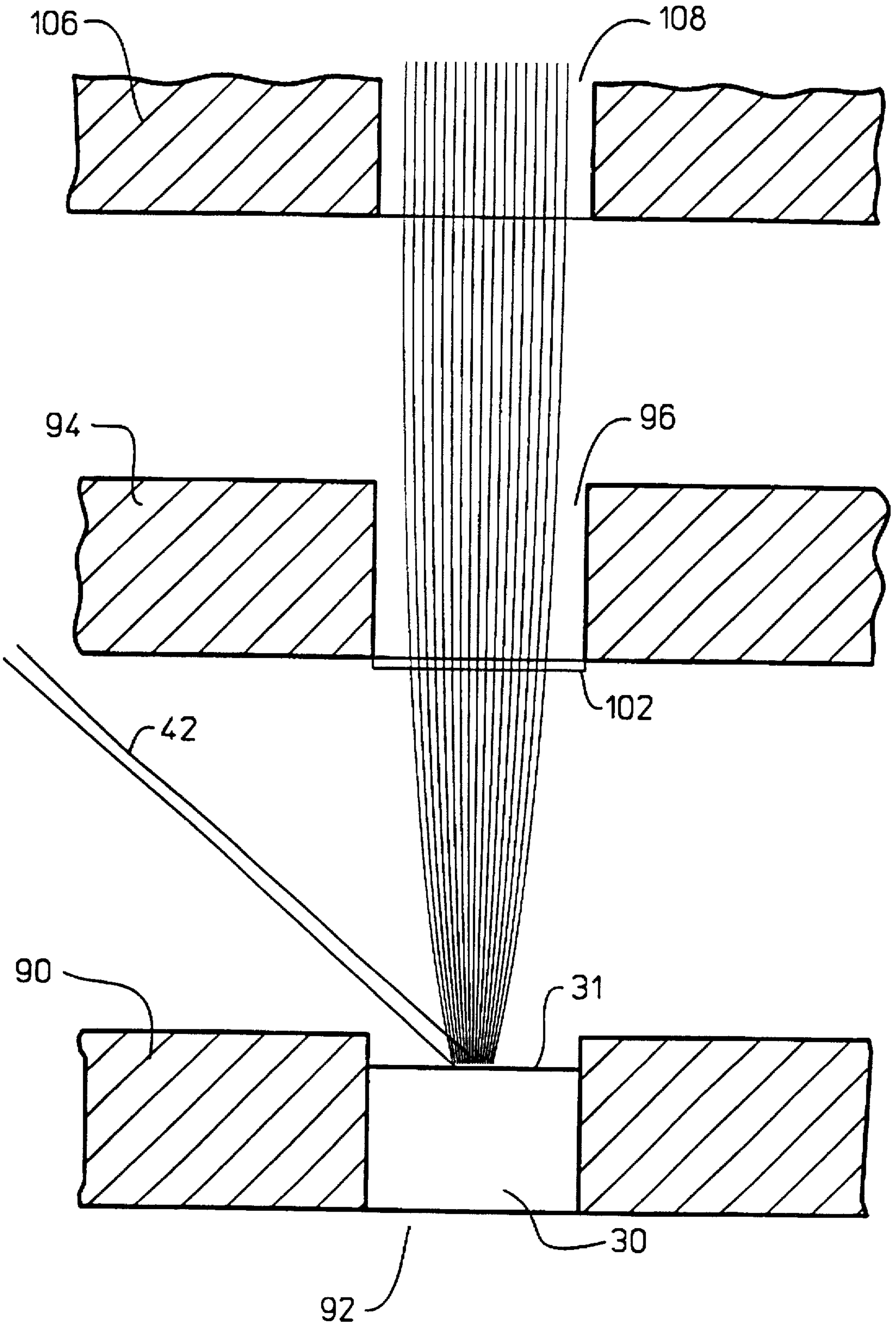
FIG. 4B schematically illustrates details of a preferred repeller, extractor and sample arrangement in the ion optics of FIG. 3.

Turning now to FIGS. 3, 4*a*, and 4*b*, details of a sample probe tip 30 inserted in ion optics 34 are now described. Tip 30 is inserted in aperture 92 in repeller 90. Tip 30 includes a tip face 31 on which crystallized sample layer of matrix and analyte is deposited. Irradiation pulse 42 is incident on tip face 31 (and thus on the sample layer) at an angle of between about fifteen and 90 degrees. A 90 degree incident angle is achieved by directing the desorption pulse 42 down the center of ion optic apertures 108, 96, and 92. In general, steeper incident angles produce laser spots of greater symmetry and smaller area. An incident angle of 15 degrees produces an ellipsoidal spot while an incident angle of 90 degrees produces a circular spot whose diameter is that of the 15 degree ellipse's short axis. Prudent ion optic and detector design provides sufficient ion-optic collection efficiency and detector conversion efficiency to employ small desorption region areas. Small desorption regions provide greater sample-matrix co-crystalline homogeneity, resulting in a narrower distribution of initial desorption threshold laser energies and initial desorption velocities. The preceding results in improved resolution.

Ion optic collection efficiency is improved by recessing probe tip 30 in aperture 92. FIG. 4*a* illustrates the condition when probe tip 30 is flush with repeller 90 through aperture 92. Because repeller 90 and probe tip 30 surfaces are coplanar, the resultant electrical fields are parallel to the surface of repeller 90. This produces minimal focusing of desorbed ions with many ion collisions into the surfaces of extractor 94 and ground aperture 106. The net result is a decrease in ion thruput from apertures 96 and 108 and a concomitant loss in electronic signal produced at the detector 66. FIG. 4*b* illustrates the preferred arrangement in which probe tip 30 is recessed with respect to the surface of repeller 90. Such positioning causes an invagination of electrical field lines which act to further focus desorbed ions. This enhanced focusing increases ion thruput and overall system sensitivity.

An electric field set up due to the potential difference between repeller 90 and extractor 94 accelerates desorbed ions through aperture 96 into free flight spool 104. Ions enter free flight spool through an aperture 108 in a plate 106 which essentially forms an entrance aperture at end 110 of free flight spool 104. Plate 108 is preferably held at ground potential, as such plate 106 may be referred to as a ground aperture of the free flight spool. Plate 106 is separated from extractor 94 by insulator 112. The separation of extractor 99 and ground aperture 106 is another important factor in providing optimum mass resolution in instrument 20. Preferably, extractor 99 and ground aperture 106 are separated by about 4 mm. Repeller, extractor and ground plates should be 3–15 mm thick. All apertures are optimal between 0.5 to 10.0 mm in diameter. All plates should be gold, copper or silver plated to insure good conductivity. Surfaces should be polished to provide good electrical field regularity.

Ions drift through free flight spool 104 generally along a flight path corresponding to the axis of the free flight spool. The ions then pass through a deflector 33. In deflector 33 an electric field, the deflecting field, of between about plus or minus five hundred volts (500 volts) and fifteen hundred volts is applied across electrodes 120 and 122, i.e., perpendicular to the flight path of the ions. The deflecting field is applied, by high voltage high frequency pulse circuitry, preferably in the form of a square-wave pulse. The width of the pulse may be selected to deflect ions of a certain mass range generally less than the anticipated mass of the analyte. The field may be applied for example to any ionized matrix molecules which may be liberated when the analyte is desorbed from the sample.

As matrix molecules are lighter than the analyte molecules, they will travel faster down free flight spool 104 and will thus arrive at deflector 33 before the analyte molecules. As such, the deflecting field may be applied to deflect the matrix ions and then turned off in time to allow analyte molecules to pass undeflected through the deflector and through an aperture 124 in an end plate 126. End plate 126 is held at ground potential. The combination of deflector 33 and end plate 106 forms in effect a mass filter. Specifications of the end-plate are identical to those of repeller, extractor, and ground plate.

In order to insure mass filter or deflection cut-off accuracy and to avoid deflection field electrical coupling with other ion optic fields, a novel control algorithm has been employed. It has been demonstrated that different laser assemblies exhibit different characteristics with respect to the time lag existing between laser trigger and photon release. Furthermore, this lag is subject to variation for a given laser assembly. Such variability must be accounted for if the deflection mass filter is to exhibit good precision. It has also been demonstrated that rapidly changing electrical fields, such as those employed in such deflection techniques, will electrically couple to adjacent electrical fields in such a manner as to alter the magnitude of these fields. When this occurs, a variance in total ion kinetic energy is created causing a resultant decrease in resolution.

Figure 4C:
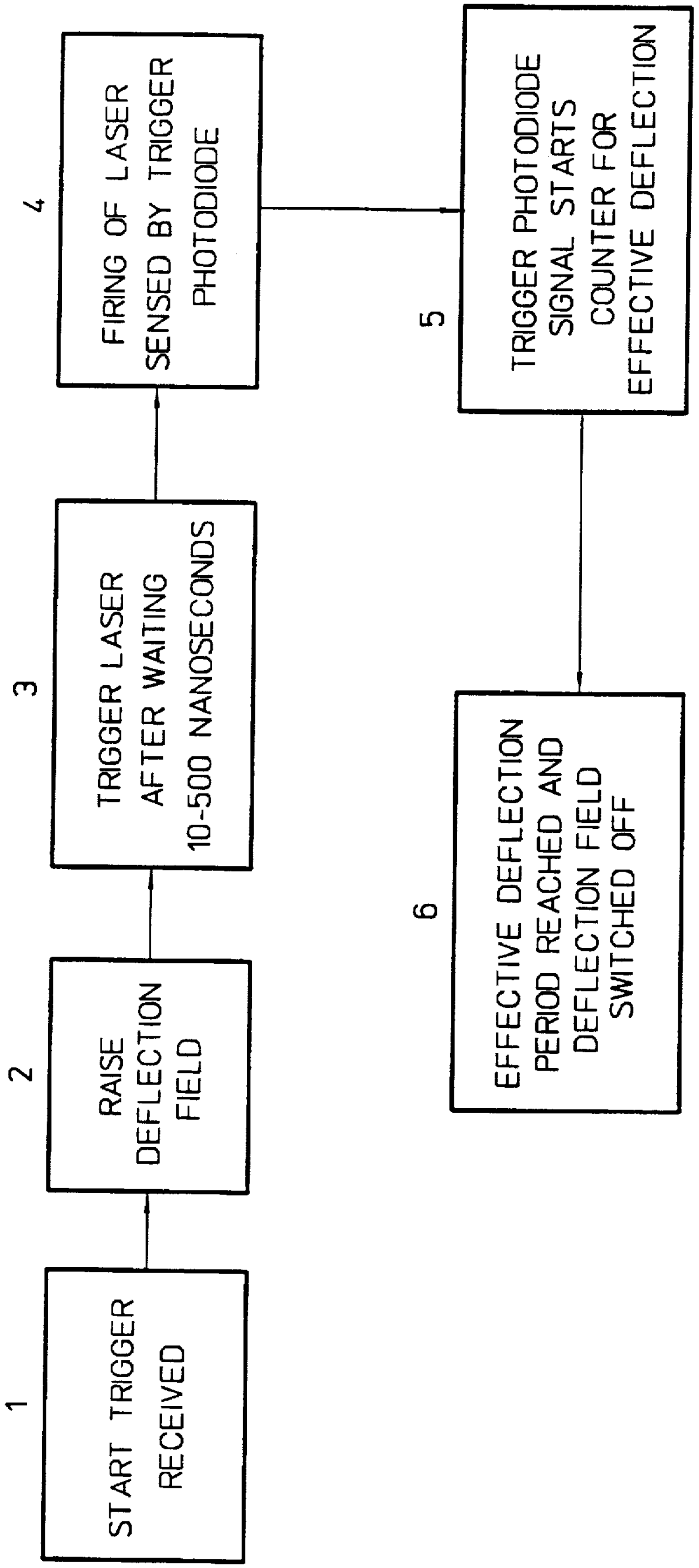
FIG. 4C is a flow chart depicting the sequence of various steps for improved deflection-mass filter algorithm.

To avoid these problems, the following algorithm has been developed (see FIG. 4*c*). A general start trigger pulse is generated and then received by circuitry in the central microprocessor (block 1). This pulse triggers the raising of the deflector fields (block 2). While this field is raised, electrical coupling occurs with the remaining ion optical fields, but no analyte has been desorbed. A 10–500 nanosecond stabilization wait period then ensues (block 3) after which a constant deflection field is reached and all coupling phenomenon ceases. At the completion of the waiting period, a laser fire start pulse is transmitted from the central microprocessor to the laser (block 4). When the laser fires, it activates a trigger photodiode assembly (block 5) which then starts a central microprocessor timer set for an effective deflection period. The effective deflection period is that time interval which extends from the laser photon release/analyte ionization event to entrance of these ions into the deflection region. The effective deflection period is chosen to act as a high pass filter, in which unwanted, lower molecular weight ions are deflected. At the completion of the effective deflection period, the deflection field is rapidly dropped (block 6).

In the afore-described ion optic assembly, all ionized species will have exited the ion optic acceleration region when deflector decay coupling occurs.

Another important feature of the ion optics assembly is an arrangement which limits the amount of stored charge found within the high voltage lines (repeller and extractor) which supply the required potential differences for the ion optic lenses/plates. Many types of high voltage power supplies which may be used to supply the desired potentials to these elements are capable of generating between about one hundred and one thousand microamperes of current. Such current levels can result in a high amount of stored charge. If a catastrophic event such as an electrical short or severe corona discharge or arc should occur within the ion-optic harness or ion optic elements, damage to these components and even to electronic signal processing equipment may occur. Damage to ion optics components may cause electric field distortion which may in turn adversely affect measurement performance.

In the normal operation of LDIM instrument 20, the ionization current generated by a single desorptive event may be as large as 14.6 amperes, normalizing total charge transfer to one second interval. This is far greater than the ion currents observed for electro-spray or other soft-ionization techniques. Consequently, the LDIM instrument requires the storage of approximately one microcoulomb of charge. However, this charge must be rapidly mobilized during the 3 to 10 nanosecond desorption event in order to maintain a constant field strength within the repeller and extractor ion optic regions. Because of the latter, the required electrons cannot be stored in the cable assembly or the high voltage power supply. Such charge must be stored directly between repeller and extractor plates and between extractor and ground plates. The latter is achieved by the use of a strong dielectric as insulators 98 and 94. Without the use of such dielectric insulators, the charge capacity (capacitance) of the ion optic acceleration region is approximately 9 picofarads. Proper selection of a dielectric such as Mykroy/Mycalex glass-mica can increase ion-optics capacitance to 61 picofarads. This assembly will store sufficient charge at 30 KV potential to maintain constant field strength during the desorption event.

Because of the above noted phenomenon, it is prudent to limit stored charge within the ion-optics cables. This may be achieved by limiting the current output into these cables through the use of a current limiting resistor (130, 132, FIG. 5). Resistor 130 may be connected, by high voltage line 128, between repeller 90 and power supply (not physically shown in FIG. 5 but represented by the symbol HV) and a resistor 132 may be connected, by high voltage line 134 between extractor 94 and a power supply (HV).

The resistors are preferably high stability, high voltage resistors and may have a resistance value between about fifty and two hundred megohms. For example, if repeller 90 were held at 30,000 volts and resistor 130 had a value of two hundred megohms, current passing through resistor 130 would be limited to one hundred fifty microamps. This may be about sixty percent less than the current capability of the power supply.

An additional advantage to the employment of such resistors is the limiting of high voltage ripple. High voltage ripple is a high frequency (1 Khz or greater) AC signal which is present between 1 and 0.03%. If a 1% ripple is present in a 30 KV DC signal, the total amplitude of the DC signal could vary from a maximum of 30,300 volts to a minimum of 29,700 volts. Such a variance would cause a simultaneous alteration of molecular total kinetic energy causing a simultaneous decrease in resolution.

The addition of current limiting resistors to high voltage lines creates a low pass RC filter. Typical capacitance of high voltage cabling is between 10 and 100 picofarads. The combination of a 100 megohm resistor with a 100 picofarad capacitance high voltage line produces an effective RC filter of 10 milliseconds. Thus, this arrangement would behave as a low pass filter with a 100 HZ cut-off. Such filtering successfully eliminates all ripple while having no effect upon ion-optic performance.

Figure 5:
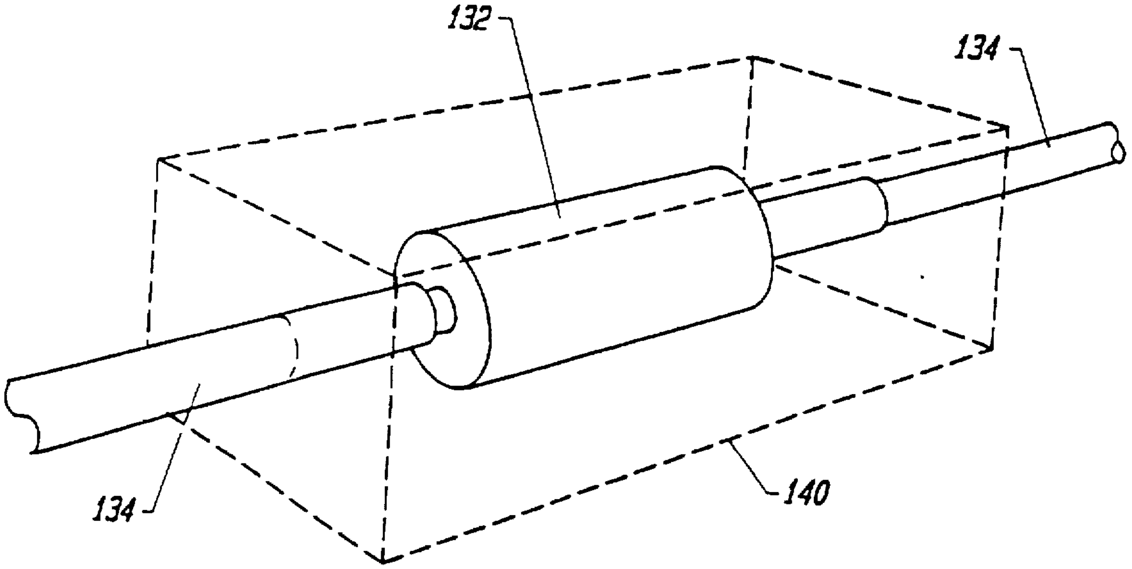
FIG. 5 schematically illustrates an embedded resistor for limiting current and minimizing AC ripple in ion optics according to the present invention.

A preferred method of connecting resistors 130 and 132 to high voltage lines 139 and 128 is to splice them such that they become, in effect, part of the high voltage lines. Resistors and attached high voltage lines are preferably insulated as a single unit by embedding them in an insulating material. Referring to FIG. 5, details of an embedded resistor, for example resistor 132, is shown. The resistor 132 attached to high voltage lines 134 is embedded in an insulating block 140 (outlined in phantom). The resistor and high voltage lines may be embedded by placing them in a mold (not shown) of suitable form and forming insulating block 140 around them, for example by casting it from an insulating epoxy resin material.

In the general description of instrument 20 (FIG. 1) given above, it is noted that sample chamber 28 includes means or arrangement for storing a plurality of samples for analysis under vacuum. Also included is a device for inserting the samples sequentially into ion optics 32. The device and its activating members may be referred to as an auto sampler. The auto sampler allows a number of samples to be analyzed without breaking vacuum in chamber 22. Vacuum conditions in chamber 22 may thus be maintained substantially constant over several measurements. This significantly reduces time of flight variations which may occur due to variations in the number of collisions with residual gas molecules which analyte molecules (ions) may experience during a flight period as well as improving sample thruput by minimizing the process to a single, post-sample introduction pump-down lag period.

Figures 6, 6A:
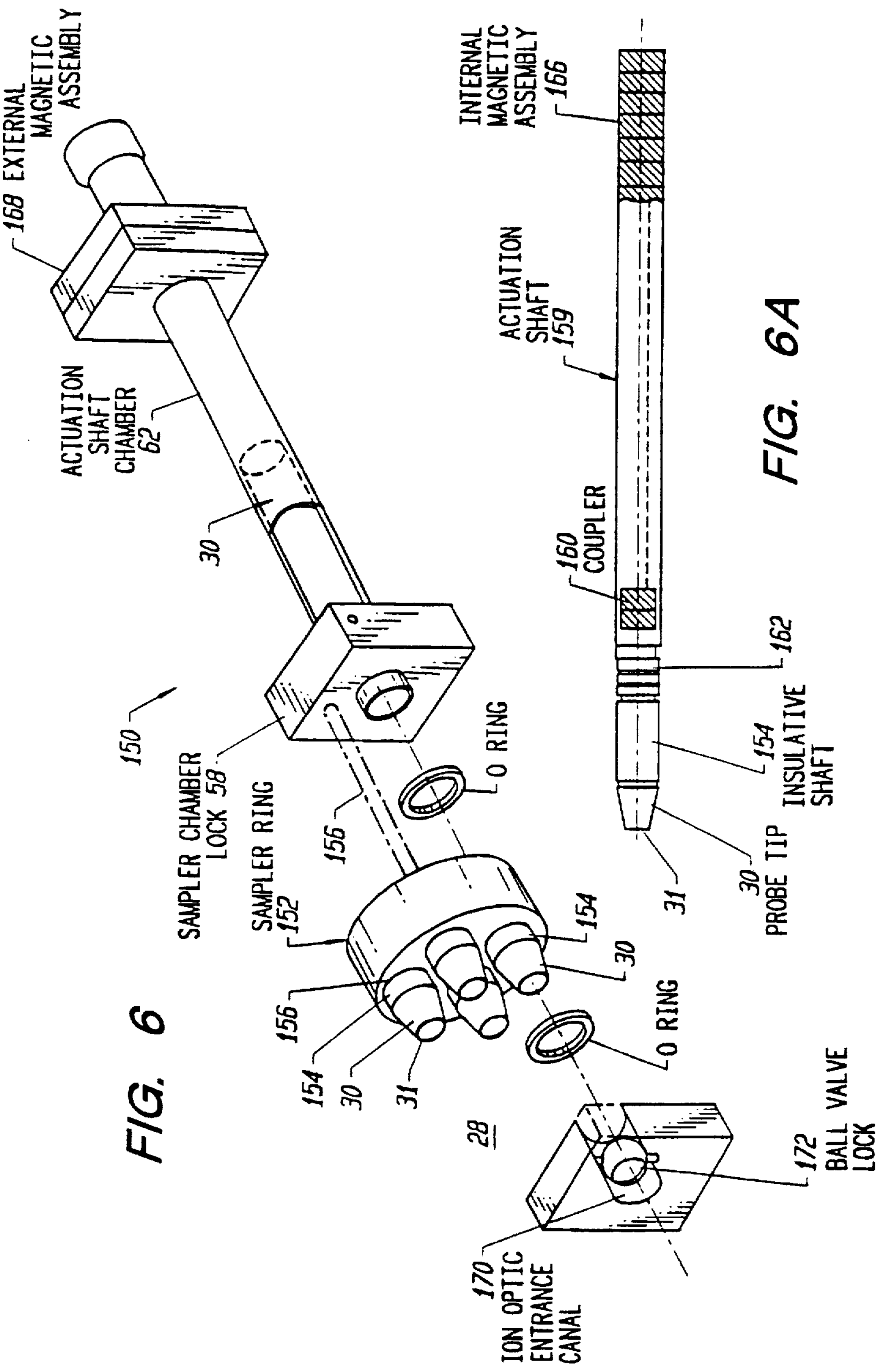
FIG. 6 schematically illustrates an autosampler arrangement according to the present invention FIG. 6A schematically illustrates details of an actuation shaft and a probe tip of the autosampler of FIG. 6.

Referring now to FIGS. 6 and 6*a* wherein an outline of sample chamber 28 has been omitted for clarity, components of auto sampler 150 include a sample ring 152 for holding a plurality of probe tips 30. Probe tips 30 are metal tips preferably plated with an inert metal such as gold or platinum. When inserted in aperture 92 of repeller 90, they may thus assume the potential of repeller 90. Each tip 30 (See FIG. 6*a*) is mounted on an insulative shaft 154 of a material such as polycarbonate. Shaft 154 extends slidably through an aperture 156 in sample ring 152. Sample ring 152 is mounted on a spindle 156 which may be extended through a rotating vacuum seal (not shown) in sample chamber lock 58 to allow sample ring 152 to be rotated from without sample chamber 28.

Actuation shaft chamber 62, which is shown in FIG. 6 as withdrawn from sample chamber lock 58, is normally attached sealed thereto, as shown in FIG. 1, such that it is in vacuum communication with sample chamber 28. Movably located in actuation shaft chamber 62 is an actuation shaft 159. Actuation shaft 159 includes at one end thereof, a coupler 160 which may engage a coupler 162 on insulative shaft 154. Couplers 160 and 162 may be either mechanical or magnetic. At the other end of actuation shaft 159 is a magnet assembly 166 which may be referred to as an internal (to chamber 62) magnet assembly.

Slidably mounted around actuator shaft chamber 62 is an external magnetic assembly 168 which may be placed in general alignment with internal magnet assembly 166 and used to rotate or translate actuation shaft 159 and thus a probe tip coupled thereto. Sample ring 152 is mounted such that a probe tip may be aligned with actuation shaft 159 and with an entrance canal 170 located in wall 24 of vacuum chamber 22. Probe tip 30 may thus be pushed through a ball valve lock 172 and through canal 170 into vacuum chamber 22 to engage repeller 90 of ion optics 32. Following irradiation, probe tip 30 may be withdrawn actuation shaft 159 back into sample ring 152. Sample ring 152 may then be rotated to align another probe tip 30 with actuation shaft 159. When no tip is inserted through canal 170, ball valve 172 isolates sample chamber 28 form vacuum chamber 32. As such when no tip is inserted through tip 170, sample chamber lock 58 may be opened to atmosphere to allow loading or unloading of samples without breaking vacuum in vacuum chamber 22.

Figure 7:
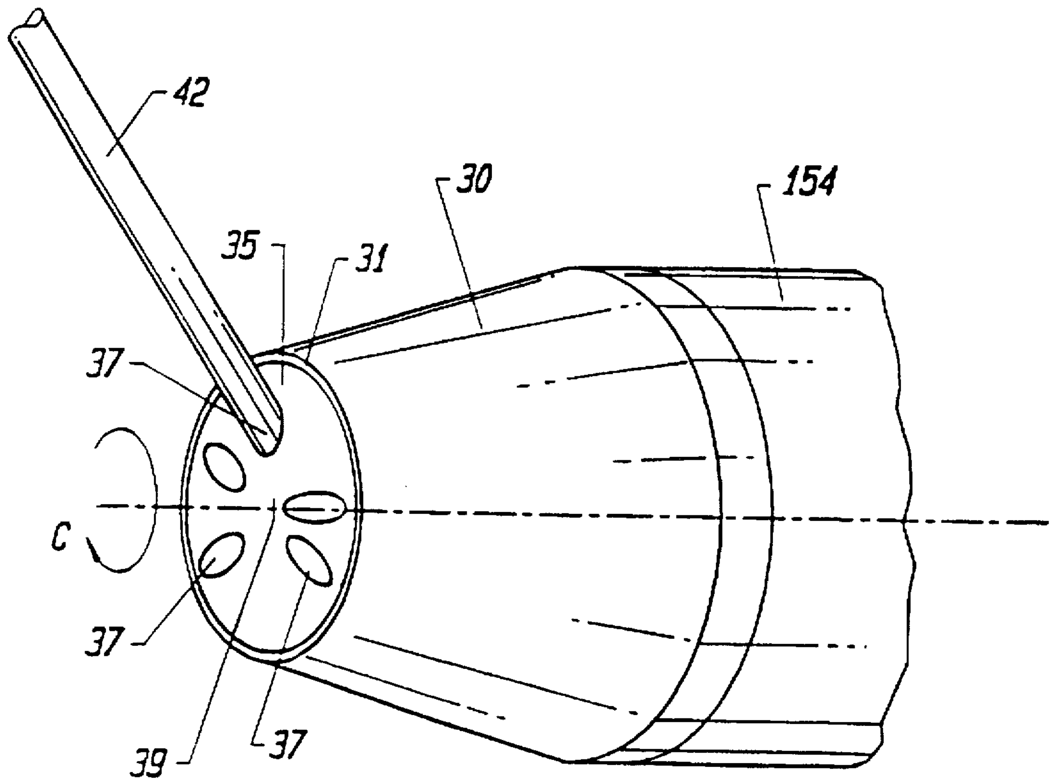
FIG. 7 schematically illustrates details of a method for providing multiple laser irradiation areas on a single probe tip.

Referring now to FIG. 7, additional means for providing multiple measurements without breaking vacuum are shown. Here, laser irradiation is incident on an area 37 located between the center and the edge of probe tip 31.

Turning now to FIG. 7, probe tip 30 may be rotated, as indicated by arrow C, such that different spaced-apart areas 37 of the sample layer, displaced from center 39, tip face 31 may be irradiated, sequentially, by an irradiating pulse 42. As such, multiple measurements may be made from one sample layer. Areas 37 preferably each have an area less than about 0.03 square millimeters.

Figure 7A:
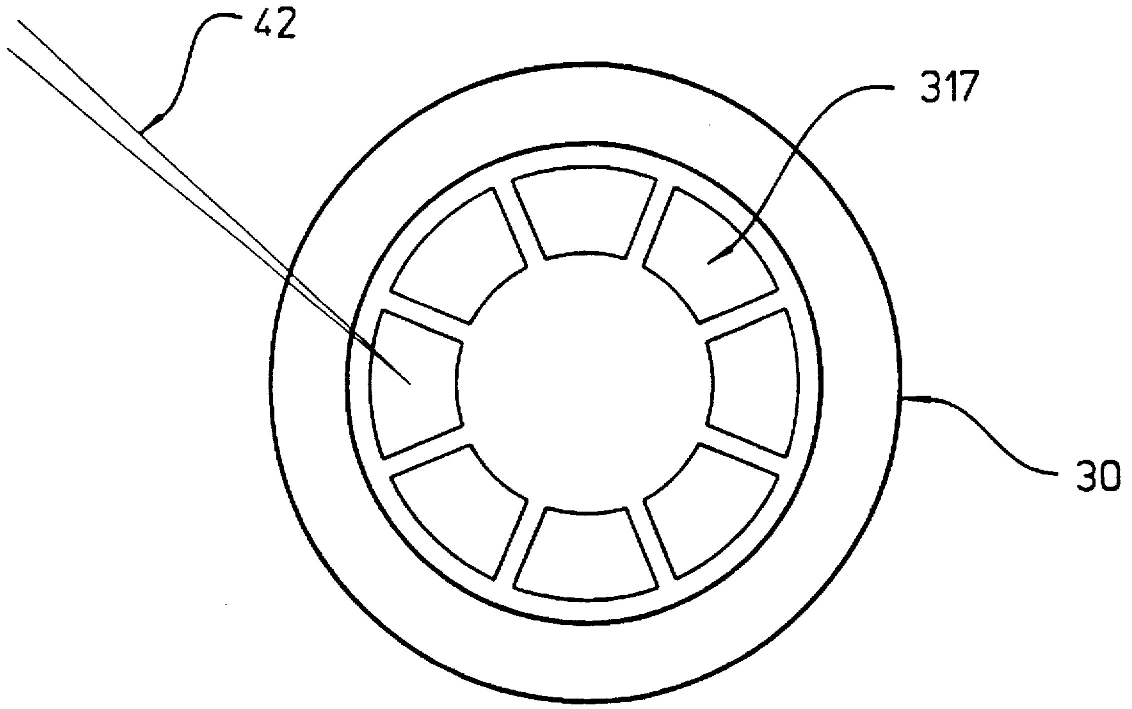
FIG. 7A schematically illustrates details of a method for providing multiple sample areas (mesas) each with multiple laser irradiation regions on a single probe tip.

Turning now to FIG. 7*a*, another preferred application of the off-axis laser incidence is to divide the periphery of probe tip 30 into several different sample support regions or sample mesas 317. Ideally, probe tip 30 could house as many as 8 mesas as shown in FIG. 7*a*. Each mesa could contain a different sample, allowing for eight different samples to be analyzed on a single probe tip, increasing sample thruput. Multiple sample desorptions are achieved upon each mesa by focusing incident radiation 42 to the periphery of each mesa 317 and then rotating probe tip 30 sufficiently to advance incident radiation 42 by one-half a desorption region.

Figure 8:
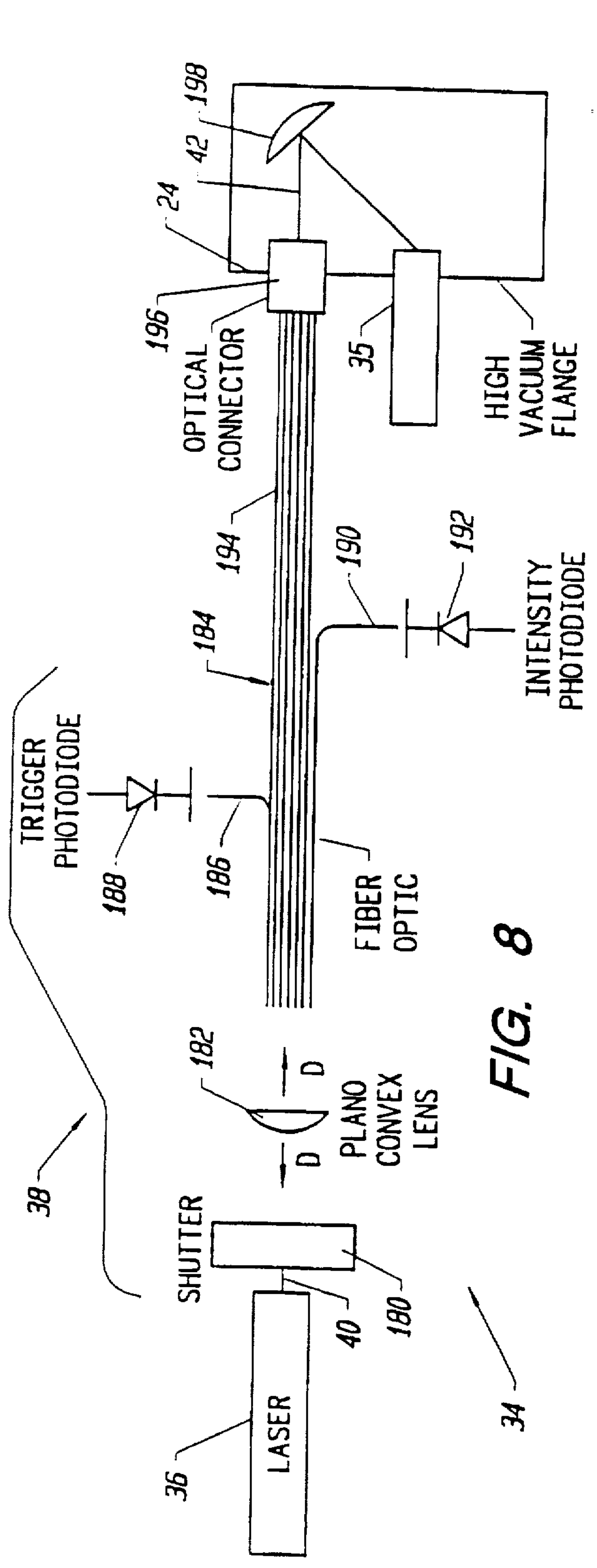
FIG. 8 schematically illustrates one embodiment of the laser optics for an LDIM instrument according to the present invention, including fiber optics for transmitting laser pulses.

Turning now to FIG. 8, one preferred embodiment of laser optics 34 is depicted. Laser optics 34 includes a laser 36 for providing light (radiation) to be directed through beam train 38 to a matrix material holding an analyte to be desorbed. Pulse (beam) 42 of laser radiation passes through a shutter 180 to a plano-convex or positive lens 182 which focusses the laser radiation on a fiber optic bundle 184, preferably of fused silica fibers for transmitting ultraviolet radiation. Positive lens 182 is adjustable in position in the direction indicated by arrows for adjusting the size of the focussed beam on fiber optic bundle 184. Any one of a number of types of pulsed laser may be used. Generally, laser 36 is selected such that it provides light radiation having a wavelength corresponding to an absorption maxima of the matrix material. For example, a nitrogen laser providing a wavelength of 337 nanometers is preferred for a sinapinic acid matrix. A preferred laser pulse width is between about 0.5 and 10.0 nanoseconds.

As discussed above, stability and repeatability of a laser pulse is important in optimizing mass resolution in an LDIM instrument. Generally, a laser will deliver its most stable output when it has been operating continuously for a period long enough for important operating parameters, for example, temperature, to equilibrate. An LDIM instrumented can be operated in a "single shot" measurement mode, i.e, the laser fires once, results are evaluated, and a decision is made, for example, as to whether or not to proceed with another measurement on the same location of the same probe or with different laser intensity. It has been found advantageous, however, to operate laser 36 in a repetitive pulse mode, i.e, the laser fires continuously at a given frequency even when a measurement is not being made. A nitrogen laser, for example, 337 nanometers, may be operated at a pulse rate between about two hertz (2 Hz) and ten hertz (10 Hz). Shutter 180 may be opened to admit a laser output pulse for irradiating the sample and closed immediately thereafter. As such laser 36 may be operated in its most stable mode while the LDIM is still used in a single-shot mode. This has been found advantageous in providing pulses having a high degree of repeatability.

In order to maximize resolution in LDIM, it is best to achieve analyte desorption using the lowest possible laser power. The use of high irradiance laser pulses increases adduct formation between analyte and matrix and also causes a broadening of initial molecular kinetic energy distribution. This optimal performance level is typically referred to as the desorption threshold. The desorption threshold is primarily dependent upon the selected matrix material and secondarily dependent upon analyte molecular weight. In general, desorption threshold energies increase with increasing molecular weight. Additionally, pulse laser irradiance generally degrades as the laser ages. Because of the aforementioned items, it is necessary to adjust the irradiance of the laser pulse to match the minimal threshold requirements for a given application.

In general, minimal desorption threshold energies are achieved by a nitrogen laser pulse of 1–20 microjoules. A preferred system (as depicted by FIGS. 8 and 10) utilizes a pulsed nitrogen laser of 100 to 500 microjoules per pulse. This pulse intensity is then attenuated by a series of glass slides or by varying the degree of focus into a fiber-optic element. Additionally, a diaphragm iris may be used to further attenuate pulse intensity. Such a system may be used to alter desorption irradiance as a function of application or to extend the usable life-expectancy for an aging laser.

From the foregoing description, it is evident that an ability to adjust the intensity of a laser pulse on a sample is useful in dealing with samples having different desorption threshold levels. Adjusting the position of positive lens 132 in the direction of arrows adjusts the size of a focussed laser pulse on fiber optic bundle 184 and may thus be used to adjust the intensity of a pulse transmitted thereby. As such, laser pulse intensity at a sample may be varied without disturbing operating parameters of laser 36.

Continuing with a description of laser optics 39, fiber bundle 184 is separated into three branches. A first branch 186 transmits a portion of a transmitted laser pulse to a first photodetector 188, preferably a high-speed photodiode, which generates a signal corresponding to the arrival of the pulse. The signal is passed to internal microprocessor/digitizer 50 where it is used to indicate time zero, i.e., the beginning of the flight or drift time for analyte molecules desorbed from a sample. A second branch 190 transmits a portion of the laser pulse to a second photodetector 192 creating a signal representative of the laser pulse intensity. The signal is integrated in an integrator amplifier (not shown) and passed to computer device 52 where it may be used, for example, to normalize quantitative data. A third branch 194 transmits the remaining portion of the laser pulse to an optical connector 196 which may be located in wall 24 of vacuum chamber 24. From connector 196 pulse 42 is directed via a focusing mirror onto a sample layer 35. Note here that details of ion optics components and the like have been omitted from the illustration to avoid obscuring optical details of the invention.

Figure 9:
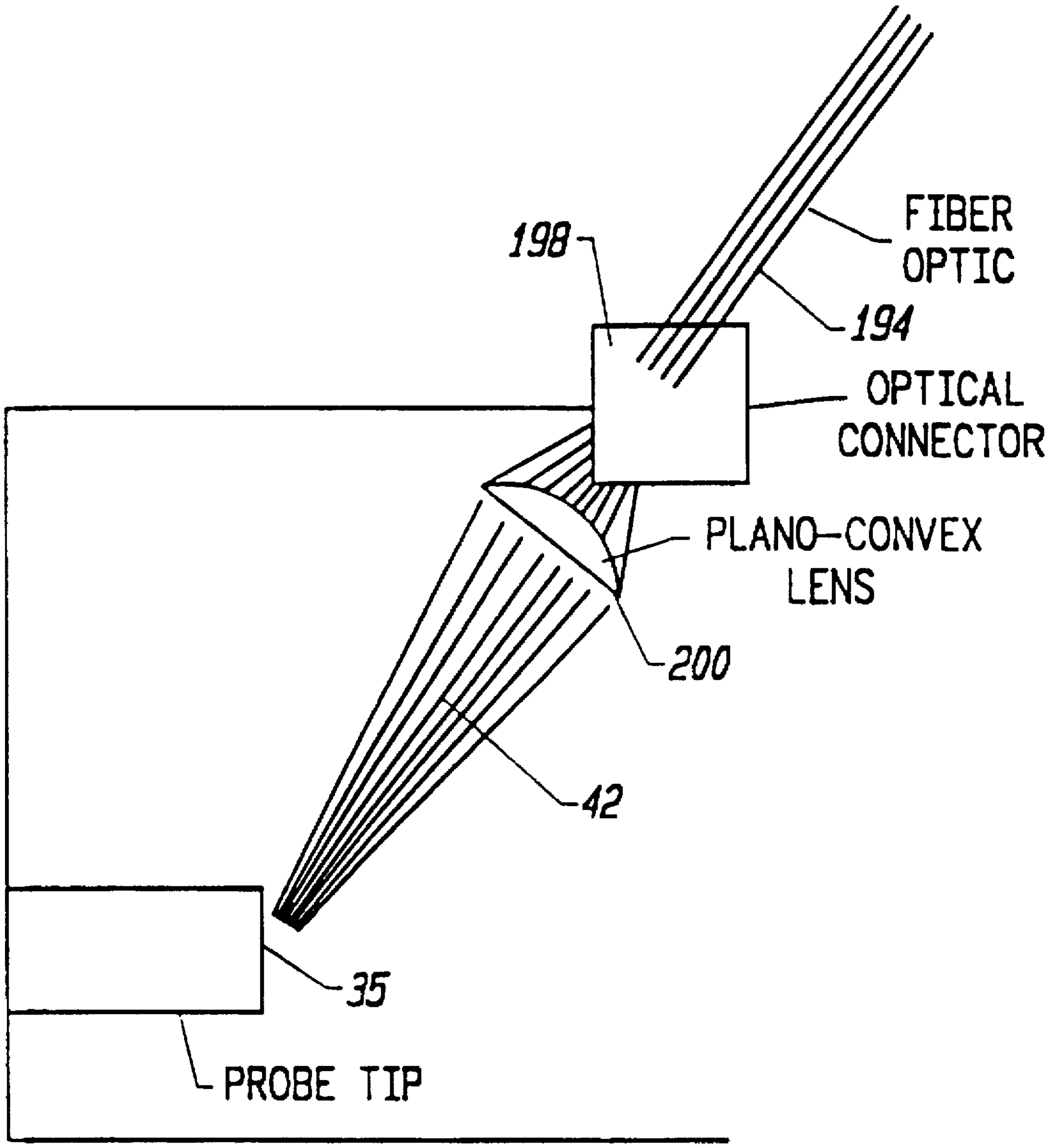
FIG. 9 schematically illustrates an alternate method of directing an irradiating pulse to a sample in the laser optics embodiment of FIG. 8.

In an alternate arrangement, illustrated in FIG. 9, optical connector 196 may be located in laser port 44. In this arrangement the laser pulse is directed through a positive focussing lens 200 which focusses the pulse directly onto sample 35 at the desired incidence angle.

Referring now to FIG. 10, in another embodiment of laser optics 34, a portion 41 of pulse 40 from laser 36 is reflected by a beamsplitter 202 to photodiode 188 for generating the timing pulse. The portion 43 of the pulse transmitted by beamsplitter 202 is passed through an attenuator 204. Attenuator 204 may comprise, for example, a plurality of thin glass plates (not shown) such as microscope slides. The plates attenuate the pulse due to fresnel reflection losses at their surfaces and by absorption of electromagnetic radiation. Should laser 36 age and lose output power, one or more plates may be removed from attenuator 209 to reduce attenuation. As such, the output pulse from attenuator 204 may be maintained at a substantially constant intensity. After passing through attenuator 204, the laser pulse passes through an iris diaphragm 206 and then through a positive focusing lens 208 which provides a means of focussing the pulse on sample 35. A second beamsplitter 210 reflects a portion 47 of the laser pulse transmitted through positive lens 208 to photodiode 192 for providing a pulse intensity dependent signal as described above. The portion 42 of the laser pulse transmitted through beamsplitter 210 is reflected by a plane mirror 212 through laser port 44 to sample as shown in FIG. 1.

Figure 11:
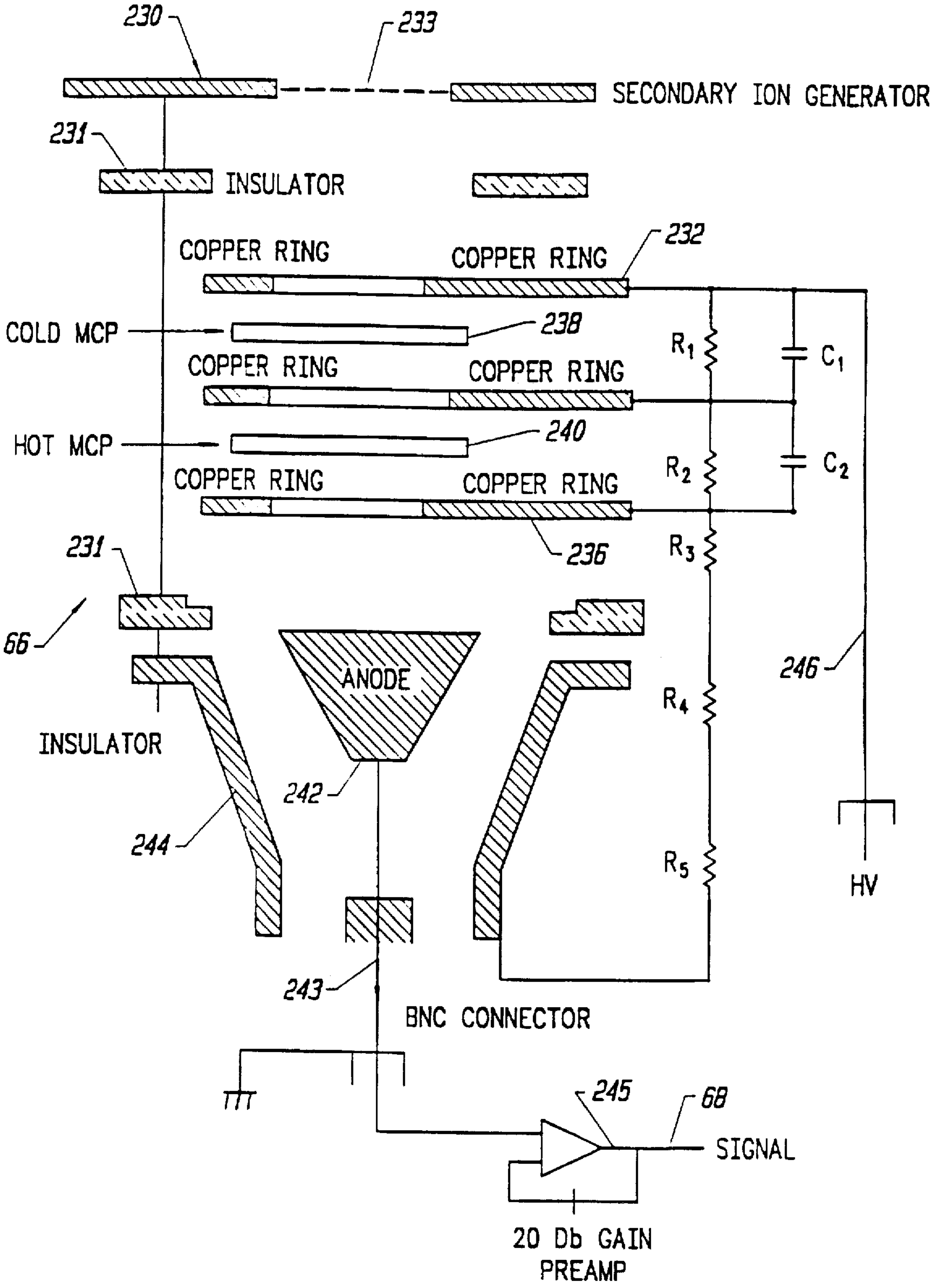
FIG. 11 is a cross-section view schematically illustrating one embodiment of a MCP detector assembly according to the present invention.

Turning now to FIG. 11, component and important features of micro-channel plate (MCP) detector assembly 66 are illustrated. Details of the mounting of the components are known to those familiar with the art and have been omitted to avoid obscuring the invention. Components of the detector include a secondary ion generator 230, an insulator 231, first, second, and third copper rings 232, 234, and 236, respectively, a first or cold microchannel plate 238, a second or hot microchannel plate 240, an anode 242, and a surrounding support 244, and a support member 294.

Charged molecules of the analyte drift from ion optics 32, down vacuum chamber 22, and arrive at secondary ion generator 230. The arriving molecules have a large mass but generally only one unit charge. As such the large molecules do not generate an optimum signal in an MCP detector.

The secondary ion generator 230 provides that large molecules are fragmented into a number of small molecules each having a unit charge, essentially amplifying the signal. Secondary ion generator 230 includes a conductive screen 233 having an extremely fine mesh, for example about five hundred lines per inch. The mesh may be made, for example, from copper, silver, gold, or platinum. The mesh may be coated with a material such as nafion available from DuPont, of Wilmington, Del. Such a material when impacted by heavy charged molecules causes release of charged particles in addition to the ions created by the fragmentation of the heavy charged molecules. The screen 233 provides the fragmentation of the analyte molecules. The screen 233 is preferably held at ground potential. Ions produced by the fragmentation are primarily positive ions regardless of whether the charged analyte molecule or ion is an anion or a cation.

Ions generated by secondary ion generator 230 impinge on first microchannel plate 238. A microchannel plate comprises an assembly of microscopic tubes (not shown) which are arranged generally in the direction of travel of the ions but inclined at an angle of about five to twenty degrees thereto. An ion entering one of the tubes collides with the wall of the tube and releases electrons. The released electrons make further collisions with the tube wall as they travel down it releasing more electrons at each collision thus producing a cascade amplification process. After leaving first microchannel plate 238, electrons pass through second microchannel plate 240.

Second microchannel plate 240 preferably has a lower gain than first microchannel plate 238, but has a higher dynamic range. This allows it to accept a larger number of electrons while still providing a gain of about one thousand. One ion entering first microchannel plate 238 may produce, for example, one-million electrons exiting second microchannel plate 240. The electrons leaving microchannel plate 240 travel to anode 242 producing a signal 243 which is passed through a 20 db preamplifier 245 to produce signal 68 which is delivered to microprocessor/digitizer 50 for computing time of flight. The bandwidth of the preamplifier may be selected between 10 and 100 Mhz to aid in electronic filtering of resultant signals.

MCP detector assembly 66 is preferably operated at a high potential, for example, about plus or minus five thousand volts in order to impart a high velocity to ions produced by secondary ion generator 230 as they hit the microchannel plates to increase the gain across each microchannel plate. It is preferable, however, to limit the field across a microchannel plate to about one thousand volts. This is accomplished, for example, by placing a resistor R1 across rings 232 and 234, a resistor R2 across rings 234 and 236, and resistors R3, R4 and R5 in series between rings 236 and ground. If resistors R1, R2, R3, R4, and R5 have equal resistance, and a potential of five thousand volts is applied to ring 232 via a high voltage line 246, then the potential drop across each microchannel plate will be limited to about one thousand volts. Resistors R1, R2, R3, R4, and R5 preferably have a relatively high value, for example, between about 0.5 and 5.0 megohms, preferably about 2.0 megohm, ¼ to 2 watt of power capacity. A high total resistance value limits current through each resistor, thus limiting resistor joule heating. The latter is needed since joule heating would not be readily dissipated as the resistor operates in a vacuum.

A problem in MCP detectors is electron depletion. Electron depletion is the charge lost of a microchannel plate during an ion pulse amplification event. An analyte ion pulse may generate, for example, a current of about one hundred and twenty microamps. The event time period may be about 3.2 microseconds which could lead to a charge loss of about $4\times10^{-10}$ coulombs, which would be large for the amount of charge available in a microchannel plate thus causing electron depletion. To overcome electron depletion, a capacitor C1 is placed in parallel with resistor R1 and a capacitor C2 is placed in parallel with resistor R2. Capacitor C1 and C2 provide, in effect, a current reservoir.

As such, when an ion pulse passes through microchannel plates 238 and 240, capacitors C1 and C2 discharge and add more electrons to replace the depletion caused by the passage of the ion pulse. The value of capacitors C1 and C2 is preferably selected such that the combination of C1 and R1 or C2 and R2 does not create a filter or RC network which will reduce signal strength of subsequent measurements or completion of discharge of the system. Preferably, C1 and C2 each have a value between about 0.1 and 5.0 nanofarads. For example, a one nanofarad capacitor in parallel with a two megohm resistor provides a total duty cycle of about 2 msec if total discharge of the capacitor occurs. At a laser pulse repetition rate of 5 Hz, there would be a minimum of about 200 msec between analyte ion pulses, i.e. if every laser pulse was used for desorption. This provides an ample time interval for the capacitors C1 and C2 to recharge between pulses.

When an individual channel of a microchannel plate becomes totally discharged due to electron depletion, they are no longer capable of converting ion signal to electronic signal. This refractory period is known as dead time. Typical dead times for such devices can be as long as 30 milliseconds. A preferred method to minimize dead-time ramifications is to spread out the ion signal over a large surface area. The latter is achieved by special considerations in ion optic design and scattering produced by a secondary ion generator. Such diffusion of ion signal reduces the total charge density for each microchannel, thus minimizing electron depletion. To achieve the latter, it is necessary to use microchannel plate surface areas of 4.0 to 80 square centimeters.

Another problem inherent in LDIM measurement is the formation of quasi molecular ions. During the desorption/ionization process ions are generated which may be termed univalent parent ions. These are the ions which have the greatest application in LDIM measurement, providing the easiest interpretation of results. A univalent parent ion is one molecule of the analyte plus or minus a electron, i.e., having unit charge (a charge of 1). It is also possible, however, that an ion may be formed from one molecule of the analyte plus or minus two, three, or more electrons, i.e., having a charge of two, three or more.

Further, it is possible that an ion may be formed from clusters of two or more parent molecules having one or more charges. In general then it is possible to produce ions having a mass m times the molecular weight of the analyte and n unit charges where m and n are integers of one or more, for a parent ion m and n are equal to one. Ions having values of m and n which are different are termed quasimolecular ions, and, as the velocity of ions through a TOF tube is directly proportional to the square root of their charge and inversely proportional to the square root of their mass, each different quasi molecular ion will have a different time of flight through the TOF tube. These quasi molecular ions are artifacts of the LDIM method and are not actually present in the sample being measured. A method of identifying signals due to quasimolecular ions may be incorporated in signal processing software.

Figure 12:
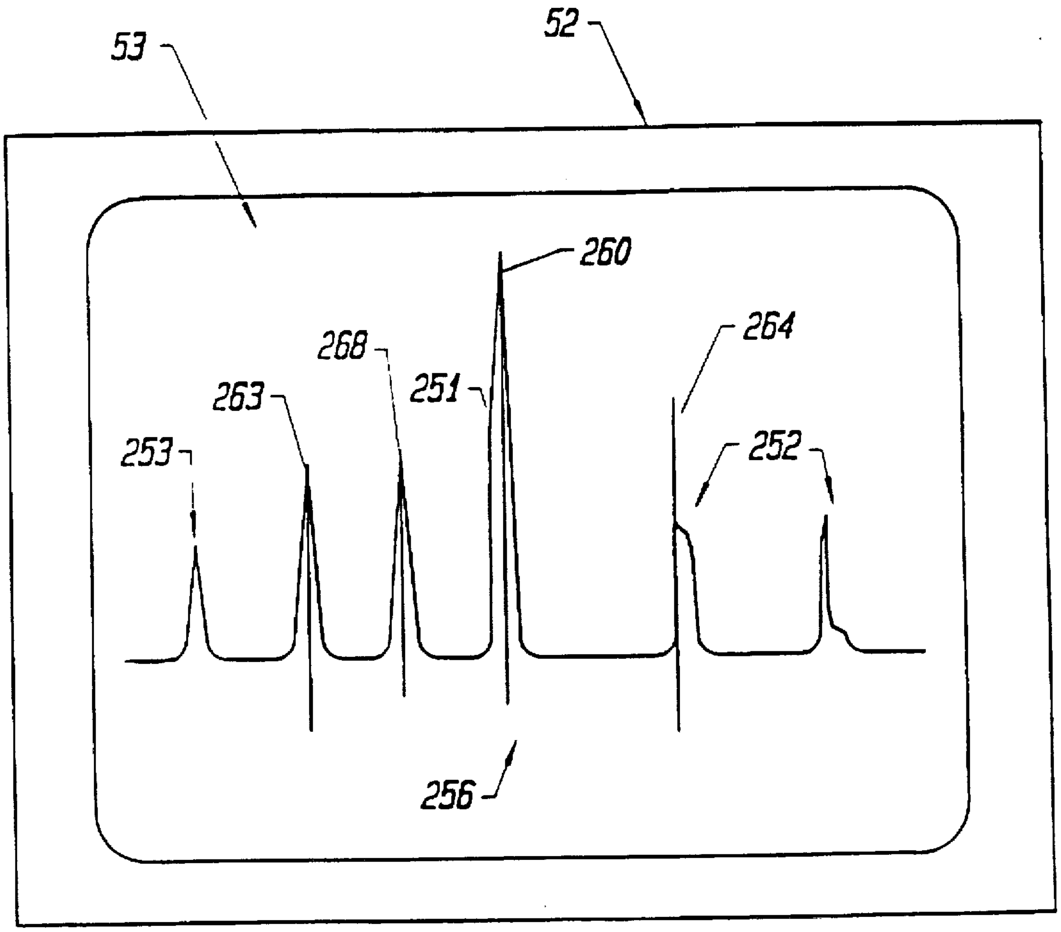
FIG. 12 schematically illustrates a sample display on a computer for evaluating measurement data produced by an LDIM instrument according to the present invention.

Referring now to FIG. 12 a method of identifying quasi molecular ions which may be controlled by a user of instrument 20 is set forth below. Signal processing software is arranged such that, after a desorption pulse has been fired, a display such as a CRT screen 53 of computer 52 displays a series of peaks 250 representing different times of flight, i.e. different mass charge ratios. This display is in effect a graph of peak intensity versus time or molecular weight. The peaks include a primary (highest) peak 251 and other lesser peaks 253. A user places a cursor 260 on the primary peak. Adjacent the primary peak, the time of flight in microseconds and the corresponding molecular weight in daltons is displayed. The software then computes the positions of quasi molecular species of a parent ion represented by the primary peak and displays cursors 263, 264, and 268 at positions on the time axis corresponding to these quasi molecular species.

For example, cursor 263 to the left of primary peak 251 may represent a quasi molecular ion having unit molecular weight two unit charges, while peak 264 to the right of primary peak 251 may represent a quasi molecular ion having twice unit molecular weights and one unit charge. Cursor 268 may represent a quasi molecular ion having three times unit molecular weight and four unit charges. A user may select the complexity of the cursor display depending on the sample being analyzed. When computed cursors representing quasi molecular ions align with displayed peaks as shown, the software can automatically identifies these peaks. The signal processing software can be implemented by one of ordinary skill in the art.

As discussed previously, another significant problem in LDIM measurements is sample preparation. It has been found that an ultrasonic spray method provides samples having superior thickness and chemical uniformity than prior art methods.

Figures 13, 14:
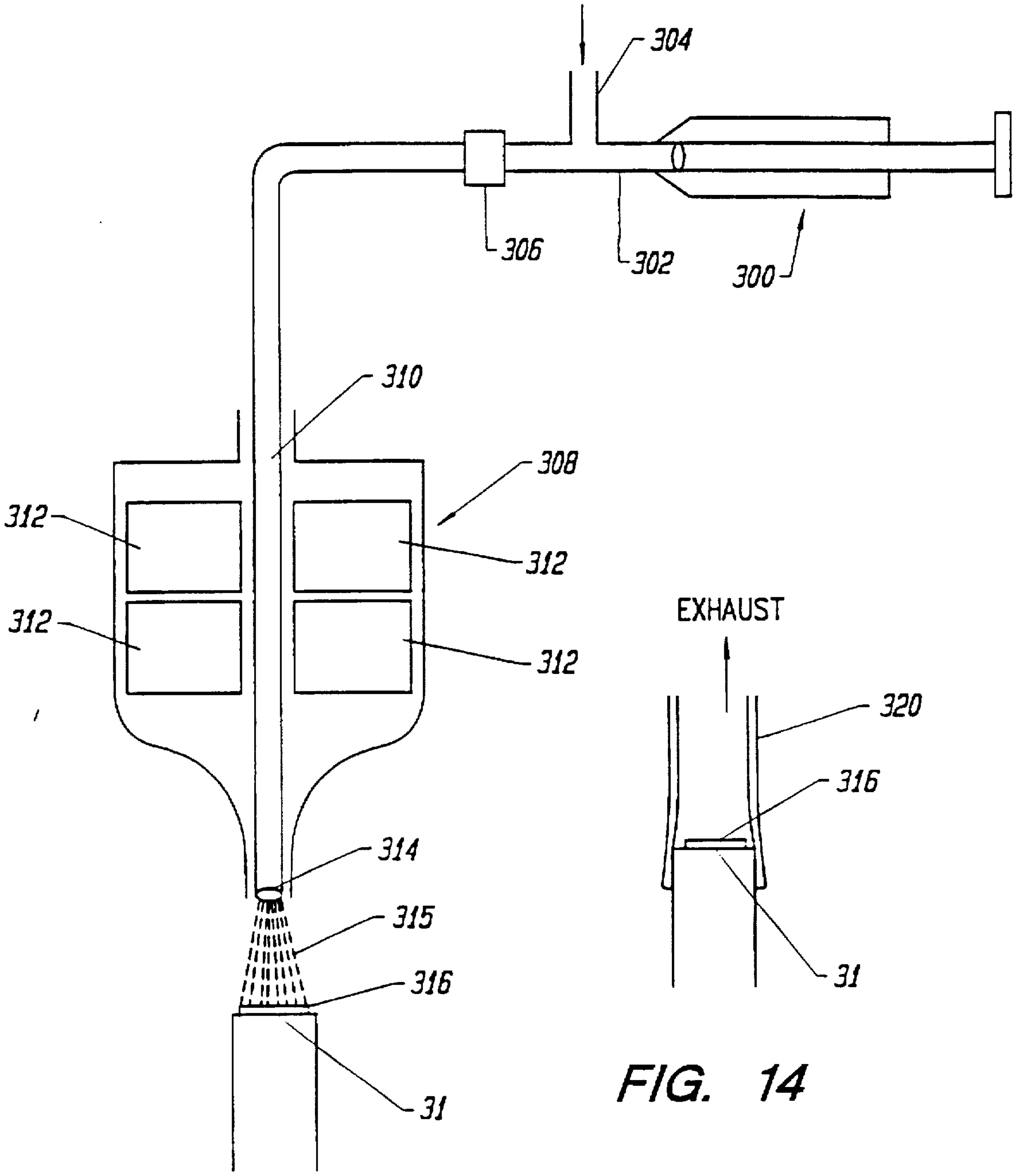
FIG. 13 schematically illustrates apparatus for applying a sample layer to a probe tip.
FIGS. 14 and 14*a–e* schematically illustrates a method of vacuum crystallizing a layer produced in the apparatus of FIG. 13.

Referring now to FIG. 13, one embodiment of an ultrasonic sample spray method and apparatus is illustrated. A syringe pump 300 contains a solution of matrix material of a predetermined composition. Matrix material is pumped from syringe pump 300 into a conduit 302 which included an inlet branch 304 through which sample material could be continuously flowed into the matrix material in the desired proportion. Matrix and sample then enter a vortex micromixer 306 where they are thoroughly mixed. The mixture then flows into an ultrasonic spray module 308. Ultrasonic spray module 308 includes a delivery tube 310 surrounded by one or more piezo electronic ultrasonic transducers 312. Energy from ultrasonic transducers 312 is concentrated into the matrix/sample mixture in delivery tube 310 and together with pressure applied by syringe pump 300 causes the mixture to exit a nozzle region 314 as an extremely fine mist 315. The mist is deposited as a layer 316 on probe tip face 31.

Probe tip face 31 is then enclosed in a sealed flexible chamber 320 (See FIG. 14) which is connected to a vacuum pump such as a rotary mechanical pump. When chamber 320 is exhausted volatiles evaporate from layer 316 and the layer crystallizes. It has been found that this ultrasonic deposition method will produce uniform homogeneous sample layers at least comparable or better than layers produced by electrospray methods without the hazards associated with high voltage operation.

Alternatively, the sample-matrix mixture may be directly deposited to the surface of the probe tip using a micropipette. From 0.5 to 1.5 microliters of mixture is typically deposited. As is the case with ultrasonic deposition, the mixture is rapidly co-crystallized by the application of a roughing vacuum (less than 1 EE–2 torr). In the event of bubble formation during the crystallization process, the vacuum level may be attenuated to prevent bubble rupture and sample expulsion from the probe tip surface.

Figure 14A:
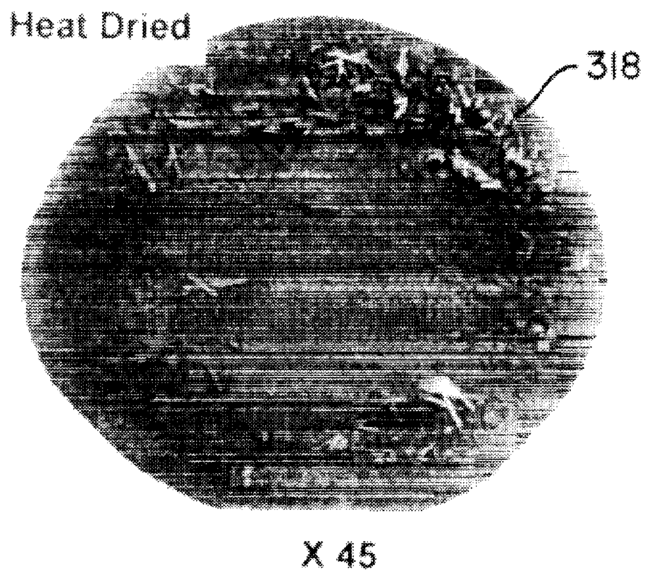
Figure 14B:
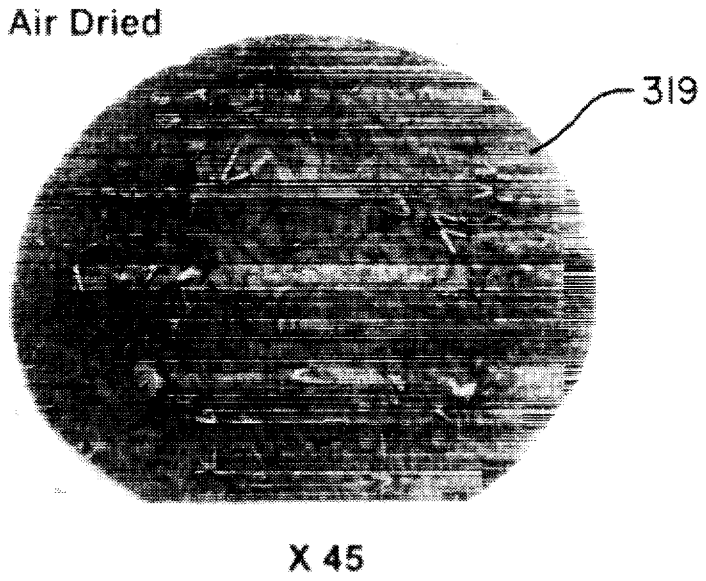
Figure 14C:
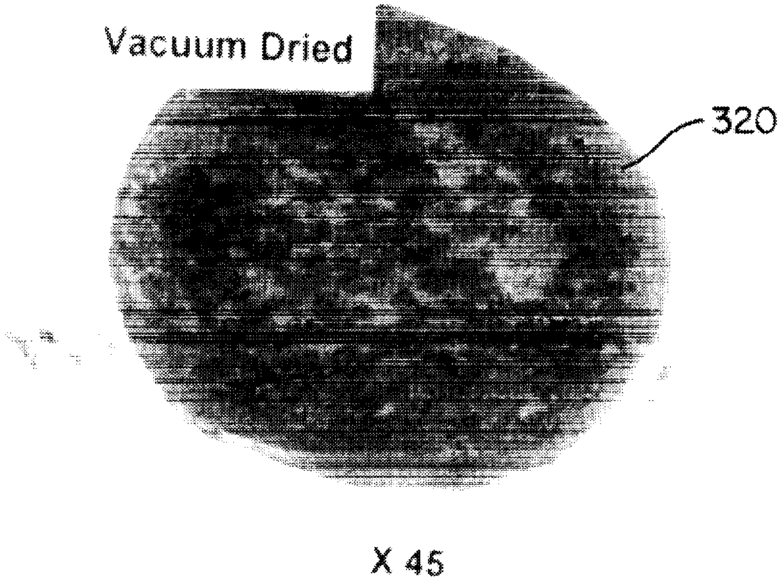

It has become apparent that vacuum-induced crystallization is the preferred method for the creation of a homogeneous deposition of small sample-matrix co-crystals. A homogeneous deposition of small co-crystals results in high desorption efficiencies with respect to hitting a co-crystalline formation with a random array of incident laser pulses as well as narrow distributions of minimal desorption thresholds and initial kinetic energies. FIGS. 14*a*, 14*b*, and 14*c* depict electron micrographs (magnification=45 X) of sample-matrix co-crystals (insulin and sinapinic acid) deposited upon a probe tip using heat drying, air drying, and vacuum drying techniques, respectively. For both heat (14*a*) and air (14*b*) dried specimens, we see the presence of relatively large co-crystalline structures sparsely distributed along the probe surface. Many intercrystalline voids exist which, when struck with incident radiation, produce no ion signal. The large heat formed cocrystal 318 and the large air formed cocrystal 319 will yield great variability in minimal desorption threshold and initial kinetic energy distribution because their size permits them to be oriented in a variety of positions with respect to the incident desorptive pulse. Additionally, the long crystallization time inherent in air drying will lead to phase isolation of sample solute resulting in a biasing in the solute-matrix cocrystallization process, as earlier described. FIG. 14*c* depicts an electron micrograph of vacuum formed co-crystals for the same sample-matrix system. In this instance, cocrystal 320 is much smaller and is uniformly distributed along the probe surface. Very few intercrystalline voids exist.

Figure 14D:
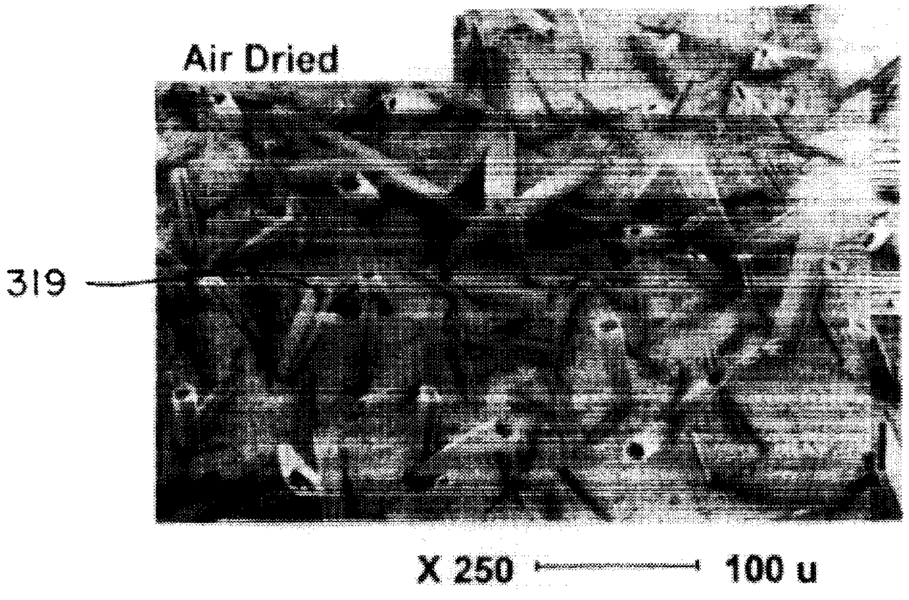
Figure 14E:
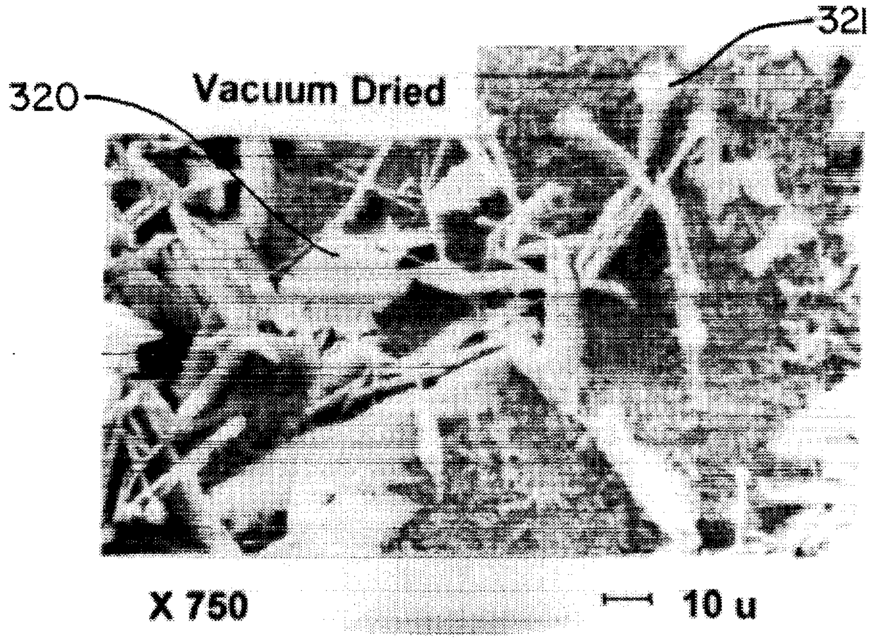

FIGS. 14*d* and 14*e* depict 250 X electron micrographs of these co-crystals for air and vacuum dried methods, respectively. The air dry cocrystals 319 resemble octagonal prisms approximately 100 to 200 microns long and 10 to 20 microns wide and are oriented in a random fashion with respect to the probe surface. This co-crystal is quite large when compared to the size of the incident laser spot. Consequently, depending upon co-crystal orientation all or just part of the co-crystal may be irradiated a single desorptive pulse. Herein lies the reason for the observed large variance in minimal desorption energy and initial kinetic energy. One possible solution to this problem is to enlarge the desorption pulse spot but this increases surface heterogeneity and will result in less than optimal resolution. The preferred solution is to generate cocrystalline structures significantly smaller than the desorptive/ionization incident pulse spot. The vacuum dried cocrystal 320 and 321 are not as regular in shape as those of the air dried process. However, they are significantly smaller than the incident desorbing/ionization pulse and thus yield more regular minimal desorption threshold and initial kinetic energy profiles.

Figure 15:
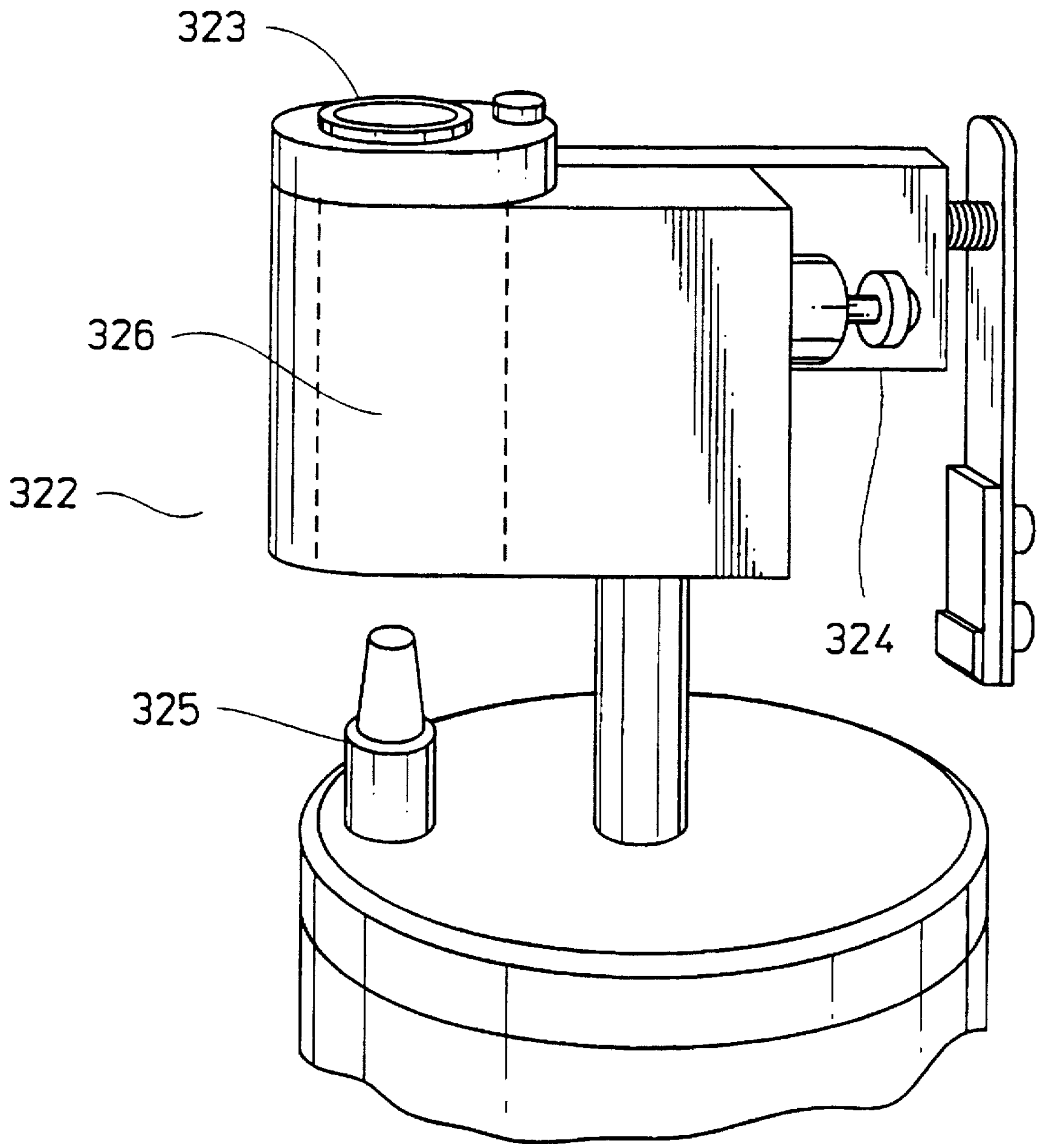
FIGS. 15 and 16 schematically illustrate the apparatus used to induce vacuum crystallization.
Figure 16:
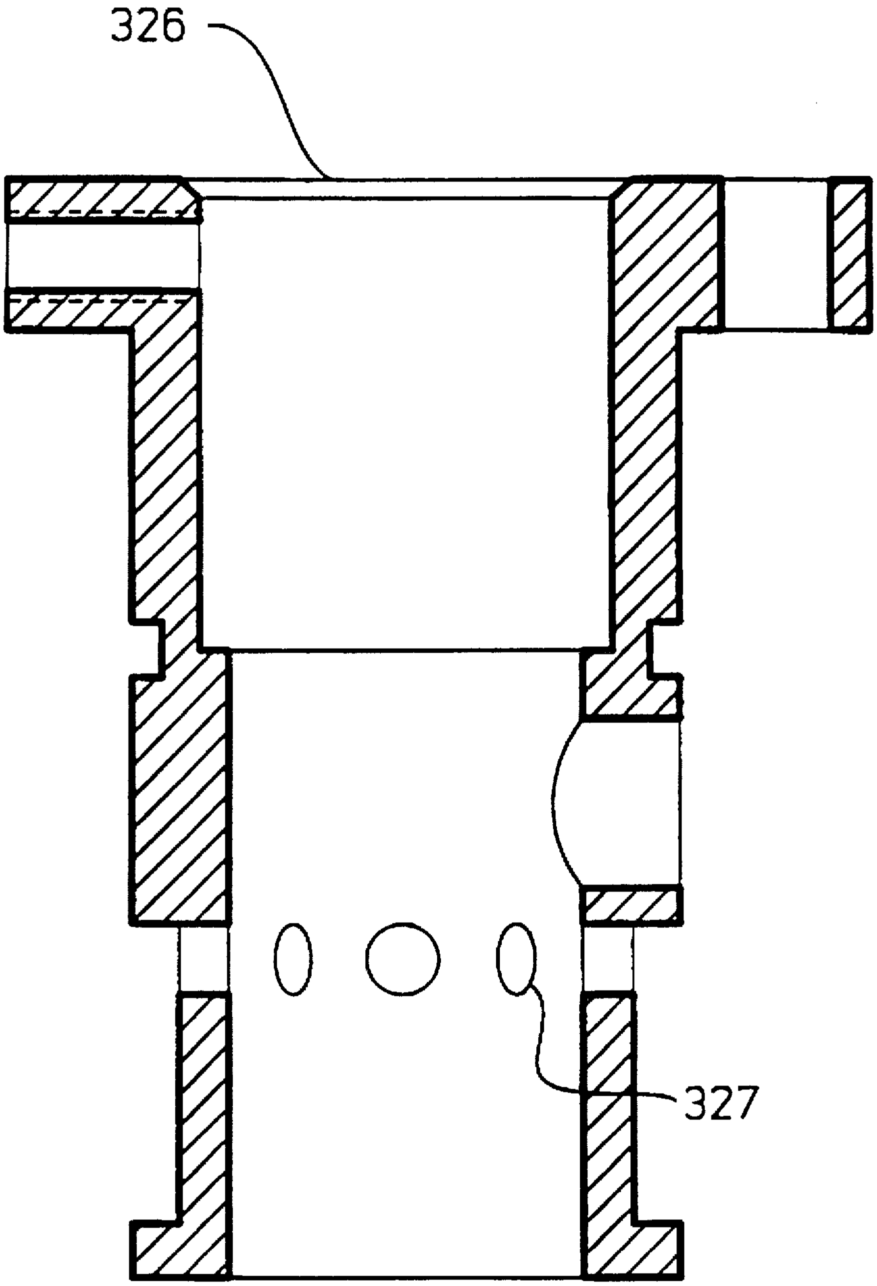

To achieve vacuum crystallization in an expeditious manner, a vacuum crystallization apparatus has been developed (322 of FIG. 15). This apparatus incorporates a 6 X ocular for the purpose of magnifying the view of the probe tip crystallization surface and a valve 324 for the purpose of controlling the magnitude of the applied vacuum. Probe tip assembly 325 is inserted into evacuation chamber 326. A vacuum is applied exterior to chamber 326 and the interior gases are evacuated through a series of port holes (327, FIG. 16). These port holes are arranged as to allow all interior gases to escape in an equipotential and symmetrical manner so that the matrix-analyte droplet remains within a state of equilibrium with respect to air flow, allowing the droplet to remain unmoved during the crystallization event. Crystallizing vacuum is applied while the sample is viewed through the 6 X ocular. If bubble formation is noted, valve 324 is used to decrease the vacuum level. Crystallization can be observed via ocular 323 and once noted, the vacuum source may be terminated. Additionally, evacuation chamber 326 is easily removable for cleaning purposes.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus for measuring the mass of organic molecules desorbed and ionized by laser irradiation of a layer of a host matrix including said molecules, said apparatus comprising:

detector means for detecting said desorbed ionized molecules and generating an electrical signal therefrom;

ion optics means for directing the desorbed molecules to said detector means;

said detector means and said ion optics means located in a first vacuum chamber; and a second vacuum chamber mounted on said first vacuum chamber said second chamber including means for holding a plurality of probe tips each having a tip face holding a layer of a host matrix including said organic molecules to be measured, and means for removably inserting a predetermined one of said probe tips into said first vacuum chamber without breaking a vacuum therein.

2. The apparatus of claim 1 further including laser optics means for directing a laser pulse to irradiate a predetermined area of the layer of host matrix on one of said plurality of probe tips in said first vacuum chamber for desorbing and ionizing the organic molecules.

3. The apparatus of claim 2 wherein said predetermined area is located between the center and the edge of said tip face.

4. The apparatus of claim 3 further including means for rotating said tip face such that spaced apart areas thereof are sequentially irradiated.

5. The apparatus of claim 2 in which the probe-tip contains a plurality of sample areas, each sample area having several achievable desorptive regions accessible by rotating said probe tip face such that spaced apart areas of said single sample area are sequentially irradiated, and separate sample areas accessible by rotating said probe tip face such that spaced apart areas of said probe-tip are sequentially irradiated.

6. The apparatus of claim 1 in which a plurality of probe tips are stored in high vacuum conditions and sequentially introduced into the ion optics region.

7. The apparatus of claim 1 where said ion optics means includes a repeller and in which the probe tip is positioned in a recessed manner with respect to the repeller surface.

8. The apparatus of claim 2 in which the angle of incidence angle between said laser pulse and said predetermined area is between 15 and 90 degrees.

9. The apparatus of claim 8 wherein said angle of incidence is 90 degrees and the desorptive-ionization laser pulse travels parallel to the central axis of the ion optic apertures.

10. The apparatus of claim 1 in which said layer of host matrix including said molecules is comprised of cocrystals.

11. The apparatus of claim 1 in which said layer of host matrix including said molecules is comprised of a homogeneous mixture of analyte and matrix deposited upon one of said probe tips.

12. The apparatus of claim 1 in which said layer of host matrix including said molecules is comprised of cocrystals.

13. The apparatus of claim 1 where said ion optics means includes a deflecting field/mass filter and in which said deflecting field/mass filter control corrects for jitter in laser pulse responsivity and acceleration ion optic coupling.

14. The apparatus of claim 1 in which said ion optics means utilizes insulative dielectrics to augment ion optic capacitance and stabilize acceleration field strengths during periods of high ion current.

15. The apparatus of claim 1 in which said ion optics means include high voltage supply cables, where said high voltage supply cables include current limiting resistors which minimize cable stored charge and function to filter high voltage power-supply introduced ripple.

16. The apparatus of claim 15 in which said current limiting resistors are embedded in insulative epoxy using a mold so that the cable assembly is contiguous with said resistor.

17. The apparatus of claim 1 including monitoring means and in which said ion optics means include a repeller and extractor, where said monitoring means monitor the current of said repeller and said extractor for stability and magnitude.

18. The apparatus of claims 17 including means for discounting mass spectra data during desorption events in which said repeller or said extractor exhibit unstable or excess currents.

19. The apparatus of claim 1 where said detector means include an extended dynamic range detector using an array of cold and hot microchannel plates.

20. The apparatus of claim 19 in which said extended dynamic range detector includes a secondary ion generator comprised of a low transmissions wire mesh improving the work function and conversion efficiency of said extended dynamic range detector in converting large ions to electrons.

21. The apparatus of claim 20 in which said wire mesh is coated with a polymer which enhances secondary ion generation efficiency.

22. The apparatus of claim 19 in which said microchannel plates are coupled with capacitors to increase electron sink storage in said detector means and minimize the time for said microchannel plates to recover from electron depletion.

23. The apparatus of claim 19 in which a large number of channels of said microchannel plates are coupled with a secondary ion generator for the purpose of reducing the density of ions incident to said microchannel plates by scattering said ions over a large number of channels of said microchannel plates.

24. The apparatus of claim 1 in which said electrical signal is immediately coupled with a gain preamplifier of bandwidth between 10–100 megahertz.

* * * * *